(12) United States Patent
Picard et al.

(10) Patent No.: US 7,937,588 B2
(45) Date of Patent: May 3, 2011

(54) TECHNIQUES FOR DETECTING, ANALYZING, AND USING VISIBLE AUTHENTICATION PATTERNS

(75) Inventors: Justin Picard, Cologre (DE); Jian Zhao, North Attleboro, MA (US)

(73) Assignee: Thomson Licensing, Boulogne-Billancourt (FR)

( * ) Notice: Subject to any disclaimer, the term of this patent is extended or adjusted under 35 U.S.C. 154(b) by 976 days.

(21) Appl. No.: 10/585,396

(22) PCT Filed: Jan. 6, 2005

(86) PCT No.: PCT/US2005/000201
§ 371 (c)(1),
(2), (4) Date: Jul. 6, 2006

(87) PCT Pub. No.: WO2005/067586
PCT Pub. Date: Jul. 28, 2005

(65) Prior Publication Data
US 2008/0301767 A1    Dec. 4, 2008

Related U.S. Application Data

(60) Provisional application No. 60/534,520, filed on Jan. 6, 2004.

(51) Int. Cl.
*H04L 9/00* (2006.01)
(52) U.S. Cl. .............................. 713/176; 726/26; 726/32
(58) Field of Classification Search .......... 380/200–203, 380/54; 713/176, 189, 193–194, 168, 170; 726/26–33; 382/100
See application file for complete search history.

(56) References Cited

U.S. PATENT DOCUMENTS
4,411,015 A    10/1983    Scherl et al.
(Continued)

FOREIGN PATENT DOCUMENTS
WO    WO9928822 A1    6/1999
(Continued)

OTHER PUBLICATIONS
Search Report dated Feb. 1, 2006.
(Continued)

*Primary Examiner* — Hosuk Song
(74) *Attorney, Agent, or Firm* — Robert D. Shedd; Joseph J. Opalach; Jerome G. Schaefer

(57) ABSTRACT

Improved techniques for making copy detection patterns and using them to detect copying relationships between digital representations. The techniques include techniques for including a message in a copy detection pattern without altering the copy detection patterns entropy and reading the message, techniques for using a copy detection pattern on an analog form to determine whether the analog form is an original analog form without reference to a digital representation of the original of the analog form's copy detection pattern, techniques for increasing the sensitivity of copy detection using copy detection patterns by modifying one of two copy detection patterns that are being compared to take into account alterations resulting from the copying process, techniques for distributing a copy detection pattern across a document, and techniques for using the entropy of a copy detection pattern to locate the copy detection pattern. Also disclosed are applications of copy detection patterns with copying that involves transformations between the digital and analog forms and with digital-to-digital copying.

31 Claims, 18 Drawing Sheets

U.S. PATENT DOCUMENTS

| | | |
|---|---|---|
| 5,710,834 A | 1/1998 | Rhoads |
| 5,809,160 A | 9/1998 | Powell et al. |
| 7,054,461 B2 * | 5/2006 | Zeller et al. .................. 382/100 |
| 2002/0012445 A1 | 1/2002 | Perry |
| 2003/0156733 A1 | 8/2003 | Zeller et al. |
| 2004/0263911 A1 | 12/2004 | Rodriguez et al. |

FOREIGN PATENT DOCUMENTS

| | | |
|---|---|---|
| WO | WO0039953 A1 | 7/2000 |
| WO | WO0173997 A1 | 10/2001 |
| WO | WO03098540 A1 | 11/2003 |

OTHER PUBLICATIONS

Bishop et al., "Character Recognition Approach Involving Histogram Classification", Technical Disclosure Bulletin, vol. 21, No. 9, Feb. 1979, pp. 3461-3467.

* cited by examiner

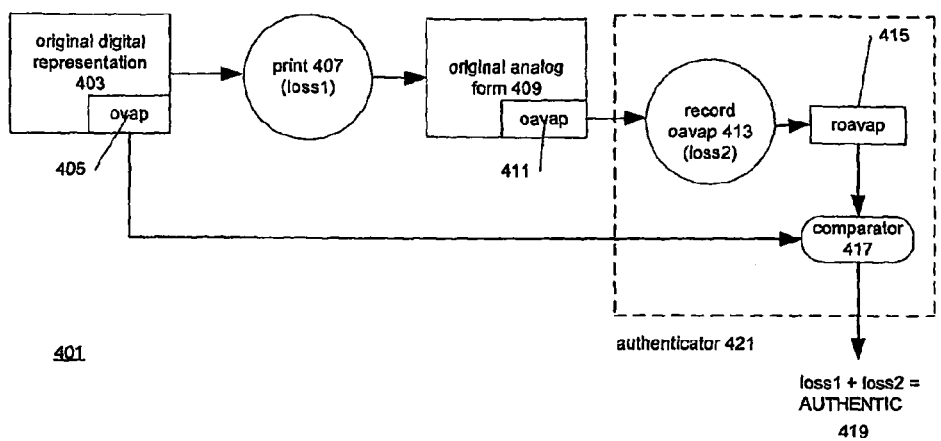
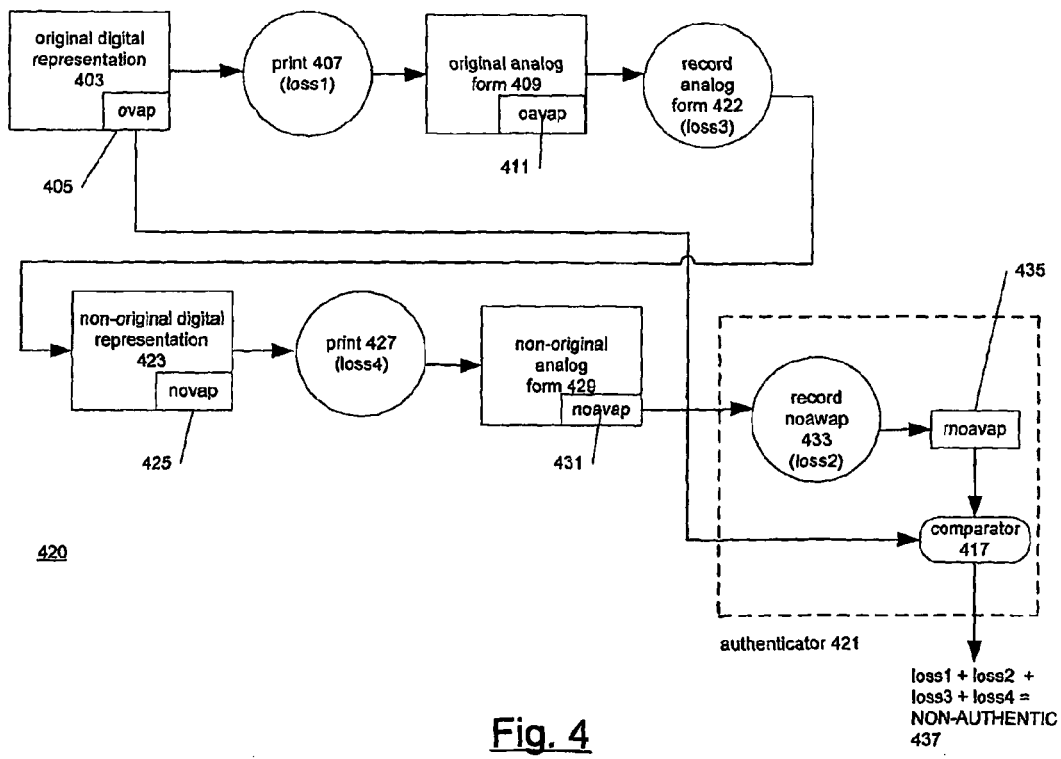
Fig. 4

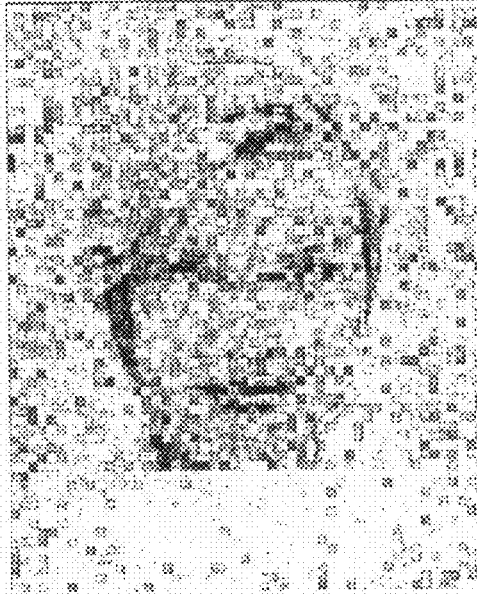
Fig. 5

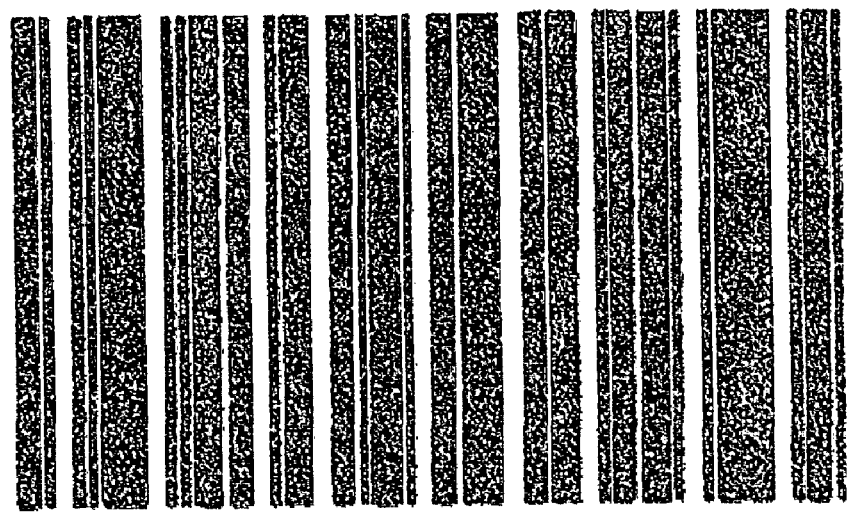
901
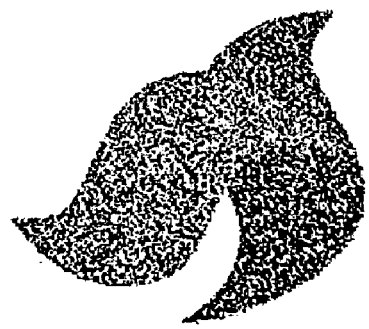
903
Fig. 9

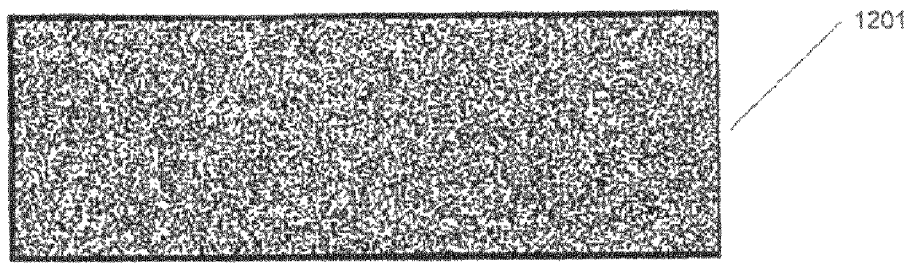
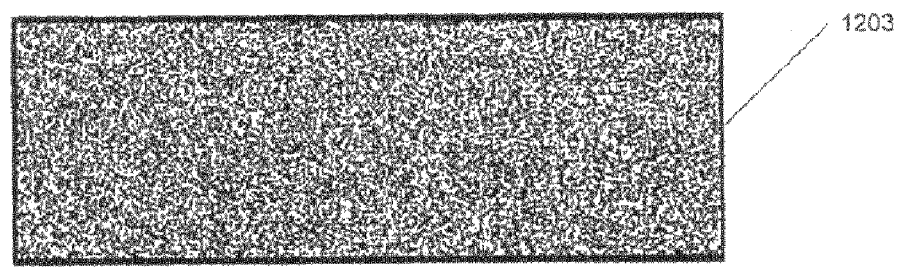
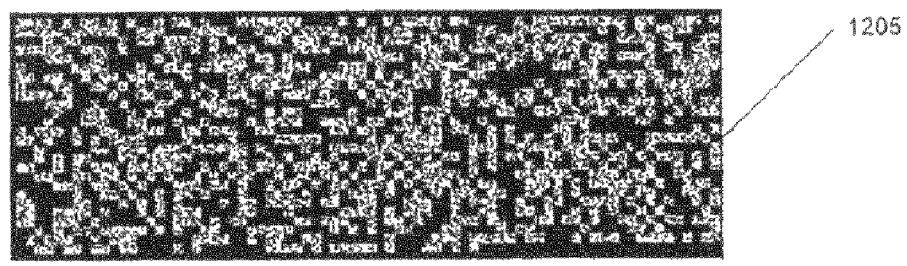
Fig. 12

1301

Obviously, the multiple CDP digital image has to be printed on the printer that will be used in the application, with the same printing parameters, and has to be scanned with the scanner of the application, with the same parameters as well. Not observing this, or using the wrong threshold and parameters, may, may lead to a less reliable detection, if not to completely wrong results.

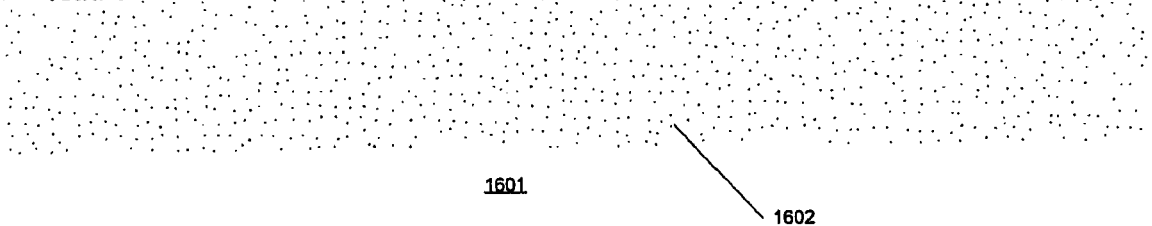

| 243 | 228 | 210 | 236 |
|-----|-----|-----|-----|
| 59  | 195 | 114 | 189 |
| 155 | 117 | 158 | 45  |
| 124 | 5   | 203 | 104 |

1702

| 12  | 27  | 45  | 19  |
|-----|-----|-----|-----|
| 196 | 60  | 141 | 66  |
| 100 | 138 | 97  | 210 |
| 131 | 250 | 52  | 151 |

1703

| 44  | 36  | 24  | 10  |
|-----|-----|-----|-----|
| 198 | 20  | 167 | 83  |
| 97  | 159 | 135 | 198 |
| 106 | 299 | 10  | 172 |

Fig. 17 vap0 1801
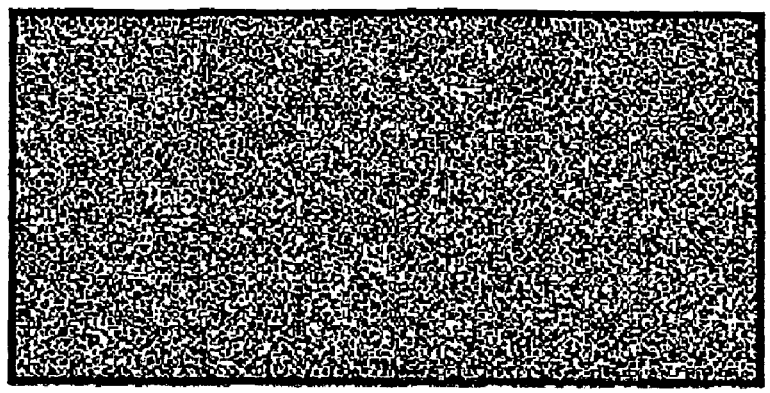
vapk 1803
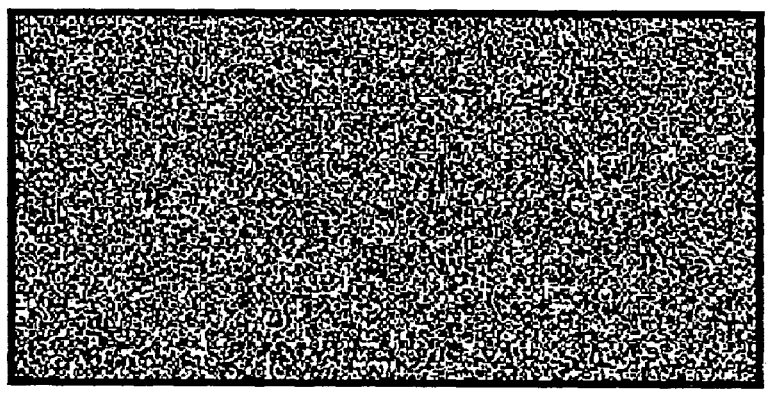
VM 1805
1234
1807
1234
Fig. 18

TECHNIQUES FOR DETECTING, ANALYZING, AND USING VISIBLE AUTHENTICATION PATTERNS

CROSS REFERENCES TO RELATED APPLICATIONS

The present application claims priority from U.S. Provisional Application 60/534,520, Visible Authentication Patterns for Printed Documents-Extensions II, having the same inventors as the present invention and filed 6 Jan. 2004. The present application further incorporates U.S. Ser. No. 10/514,271, Visible Authentication Patterns for Printed Documents, Picard, Zhao, and Thorwirth, filed 12 Nov. 2004, by reference in its entirety and for all purposes. U.S. Ser. No. 10/514,271 is the U.S. National Phase of PCT/US03/15168, which was published 27 Nov. 2003 as WO 03/098540. The Detailed Description of the present patent application contains substantial portions of the Detailed Description of U.S. Ser. No. 10/514,271. The new material in the Detailed Description of this application begins with the section titled Detecting the position of a VAP.

BACKGROUND OF THE INVENTION

1. Field of the Invention

The invention relates generally to security features in printed documents and more specifically to visible authentication patterns in printed documents. The visible authentication patterns can be used to distinguish original printed documents from photocopies of those printed documents, to detect alterations in documents, and to carry hidden and/or visible messages.

2. Description of Related Art

Visible Authentication Patterns (VAPs) can be used to determine whether a printed document has been altered or whether the document is an original or a copy. A VAP is a noisy pattern in a portion of a digital document. It is used to determine the authenticity of a document by comparing a portion of a digital recording made from the analog form with an original digital representation of the portion of the analog form to determine a degree of dissimilarity (or similarity) between the recorded portion and the original digital representation of the portion and using the degree of dissimilarity (or similarity) to determine whether the analog form is an original analog form.

VAPs and their uses are the subject of U.S. patent application Ser. No. 10/514,271, cited above. Further experience with the VAP has resulted in improvements in a number of areas:

Storing information in a VAP without affecting the VAP's property of distinguishing copies from originals;
  Using the entropy of a VAP to locate it in an image of a document;
  Lessening the aesthetic effect of incorporating a VAP into a document;
  Dealing with the fact that a VAP may be subject to a wide variety of printing and scanning processes, and these processes will modify the VAP as it appears on an original analog copy and on a non-original analog form;
  Using analogs to the VAP in other applications involving transformations from digital to analog and vice-versa and even in digital-to-digital copying.

It is an object of the inventions disclosed herein to provide VAPs which are improved with regard to these and other areas.

SUMMARY OF THE INVENTION

In one aspect, the object of the invention is attained by a technique for incorporating a message into a digital authentication pattern with a minimal effect on the digital authentication pattern's entropy. In the technique, sets of pattern elements in the VAP carry message elements of the message. In each set of pattern elements that carries a message element, the values of the pattern elements are set so that they represent the message element. The manner in which the pattern elements are set has a minimal effect on the entropy of the pattern elements, and to their other desired properties. This aspect of the invention includes methods and apparatus for creating digital authentication patterns with messages and for reading the messages, as well as a digital authentication pattern which contains a message that is made using the technique.

In another aspect, the object of the invention is attained by a technique for determining whether an analog form that includes a copy detection pattern is an original analog form without reference to a digital representation of an original of the analog form's copy detection pattern. The technique scans the copy detection pattern on the analog document to make a digital representation of the copy detection pattern and uses one or more global properties of the digital representation to make at least a preliminary determination of whether the analog form is an original analog form.

A further aspect is a technique for determining a copying relationship between digital representations. Each of the digital representations includes a portion that is sensitive to alterations produced by a copying process and the technique modifies the portion from one of the digital representations to make it more comparable with the portion from the other of the digital representations. The modification takes the alterations produced by the copying process into account. When the modification has been made, the portions are compared to determine the copying relationship between the digital representations.

Still further aspects include the following:
  a visual authentication pattern for a document which is subdivided into units which are distributed across the document;
  a technique for using the entropy of a visual authentication pattern to locate the pattern;
  a digital representation of an analog signal that includes a representation of a copy detection signal that is sensitive to transformations produced by digital-to-analog and analog-to-digital conversions; and
  a digital representation that includes a first portion in which the data has error correction and a second portion in which the data has no error protection and the data is sensitive to alterations produced by the process of making a digital copy of the digital representation.

Other objects and advantages of the invention will be apparent to those skilled in the arts to which the invention pertains upon perusing the following Detailed Description and Drawing, wherein:

BRIEF DESCRIPTION OF THE DRAWING

FIG. 4 is an overview of printing and authentication of original and non-original analog forms;

FIG. 5 shows GUIs for watermark detection and alteration detection;

FIG. 9 shows how a VAP may be incorporated into a bar code or into a logo; function is generally fixed, and is applied on each test CDP after it has been restored;

FIG. 12 shows several CDP's generated with different keys;

FIG. 16 shows a CDP distributed throughout a document or an object within a document;

FIG. 17 shows the transformation of a set of pixels with a message inserted; and FIG. 18 shows how a VAP may be used for visual encryption.

Figure 1:
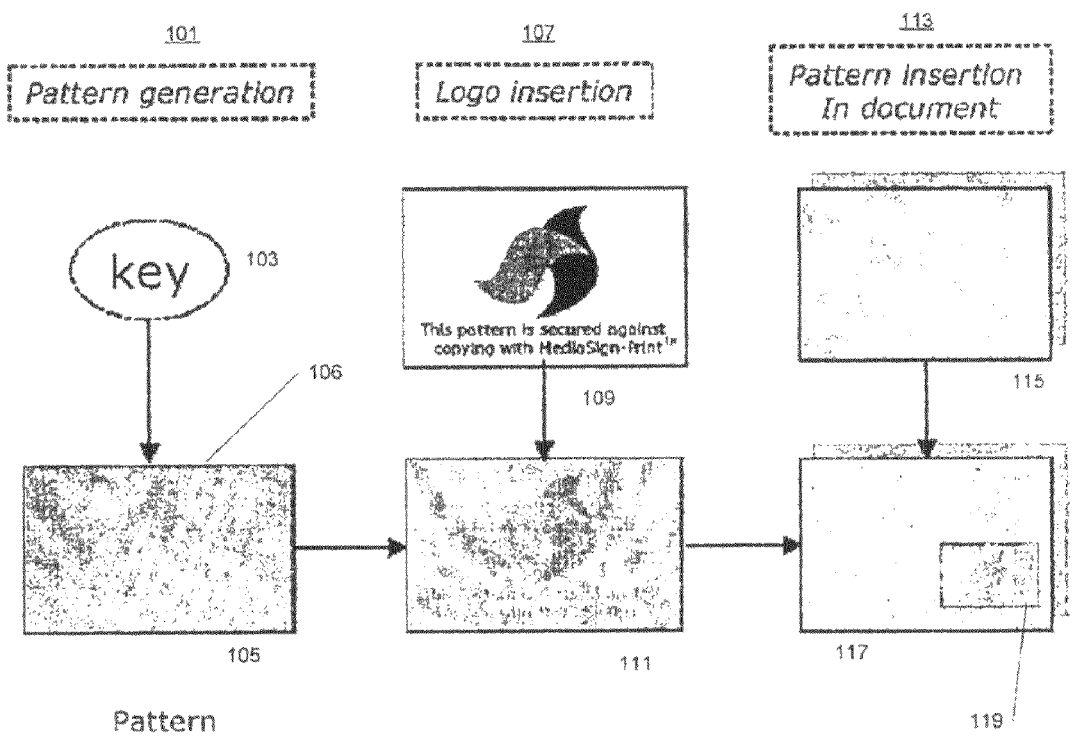
FIG. 1 is an overview of how a visible authentication pattern (VAP) is generated and inserted into a document.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed description through the section Combination of VAPs with other security technologies is taken from U.S. Ser. No. 10/514,271, Visible Authentication Patterns for Printed Documents, Picard, Zhao, and Thorwirth, cited above. As explained in that patent application, one use of digital watermarks in documents has been to detect the modifications resulting from the printing-scanning process and thereby to determine whether a document is an original or a copy. Another use has been to detect whether a document has been altered. A characteristic of both of these uses of watermarks is that they are based on the presence or absence of the watermark, not on its contents.

Visible Authentication Patterns

When a watermark's mere presence is being used to determine authenticity of an analog form, the watermark is being used as a contentless pattern. Since the pattern has no content, there is no longer any need for it to be invisible; instead, it can be added to the document as a visible element. In the following, visible patterns that are used for authentication are termed visible authentication patterns or VAPs. Because the VAP is visible, it is far easier to detect than a watermark, and the amount of degradation resulting from a copy of an original document can be better estimated. It is, however, still able to perform all of the authentication functions of invisible watermarks and in addition lets consumers of the document know that the document's authenticity is protected.

TERMINOLOGY

The following terminology will be used in the Detailed Description to clarify the relationships between digital representations and analog forms.

A digital representation of an object is a form of the object in which the object can be stored in and manipulated by a digital processing system. Objects may be or include as components documents, images, audio, video, or any other medium of which a digital representation can be made.

an analog form of a digital representation is the form of an object or component that results when the digital representation is output to an analog device such as a display, printer, loudspeaker, burner (compact disc or DVD disc), engraving or embossing equipment.

a digital recording of an analog form is a digital representation made from the analog form. The manner in which the digital recording is made depends upon the medium; for example, for a document or an image, digital recording is done by digitizing an image made from an analog form of the document or image.

an original digital representation is a digital representation made or re-created by someone authorized to do so; an original analog form is one made from an original digital representation.

a non-original digital representation is one that is made by digitally recording an analog form a non-original analog form is made from a non-original digital representation or by photocopying an analog form.

a document will be given the special meaning of any analog form which is produced by a printing process, including documents in the more usual sense of the word, labels, packaging, and objects that are themselves imprinted. Printing as used here includes processes such as engraving or embossing. To the extent that reasonable analogies can be made, everything in the following that is said about documents may be applied also to other media. For example, an audio analog form may include an audible authentication pattern that is the audio equivalent of the VAP.

Making a Visible Authentication Pattern: FIG. 1

The paradox of the visible authentication pattern is that while the pattern is visible, a possible counterfeiter must not be able to modify the pattern so that it will authenticate a document that is not authentic. This end is achieved in a preferred embodiment by making the pattern noisy, i.e., a large part of the value of the pixels making up the pattern is apparently randomly determined. Because the pattern is noisy, it is impossible to tell what values the pixels making up the digital representation of the pattern should have without access to the original digital representation of the pattern. On the other hand, given the original digital representation of a VAP, one can compare a digital recording of a VAP from a document with the VAP's original digital representation, determine how the recorded VAP has been altered with regard to the VAP's original digital representation, and can determine from the differences how the document in question has been altered. As will be seen in more detail in the following, alterations that can be detected include those involved in making non-original documents and those involved in altering information in a document.

FIG. 1 shows one way of making a visible authentication pattern and inserting it into a document. There are three steps:

generating a digital representation of the pattern, shown at 101;

an optional step of adding a visible logo or legend to the authentication pattern, shown at 107; and a inserting the authentication pattern into the document, shown at 113.

The original digital representation of the pattern 105 can be generated in any way which produces a result in which the pattern's pixels appear to have values with a strong random component. The digital representation of pattern 105 may be a gray-scale pattern, or it may employ colored pixels. It is particularly useful to employ a key to generate the pattern; the key 103 is used as a seed for a pseudo-random number generator which produces the sequence of values which are given to the pixels in the pattern. Uses of the key will be explained in detail later. The original digital representation of pattern 105 may also include components which aid in locating the pattern in a digital representation made by scanning a document that contains pattern 105. In pattern 105, black border 106 performs this function.

A visible logo or legend 109 can be added to the original digital representation of pattern 105 to make the original digital representation of pattern 111 without compromising pattern 105's noisiness because only a part of the value of the pixels making up the pattern need be randomly determined. Thus, the logo or legend can be superimposed on pattern 105 by manipulating the values of the pixels making the logo or legend in a way that preserves their randomness while causing the logo or legend to appear. For example, if pattern 105 is a gray scale pattern, the legend or logo can be made by making the pixels of the legend or logo uniformly darker or lighter relative to their original random values. The technique is similar to adding a visible watermark to an image, except that it preserves the noisiness of pattern 105.

Once the original digital representation of pattern 111 has been made, it is inserted into the original digital representation of the document 115, as shown at 113. When document 117 is printed from original digital representation 115, document 117 includes printed visible authentication pattern 119. Of course, the document may be printed onto a substrate that already has printed material on it. Thus, pattern 119 may be added to a preprinted substrate.

Figure 2:
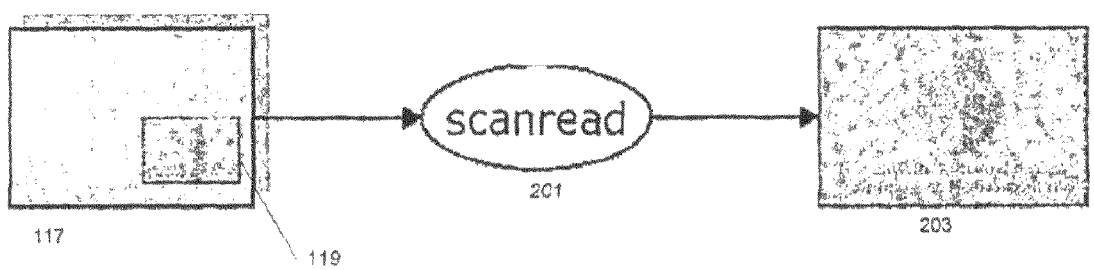
FIG. 2 shows how a VAP is recorded from a document.
Figure 3:
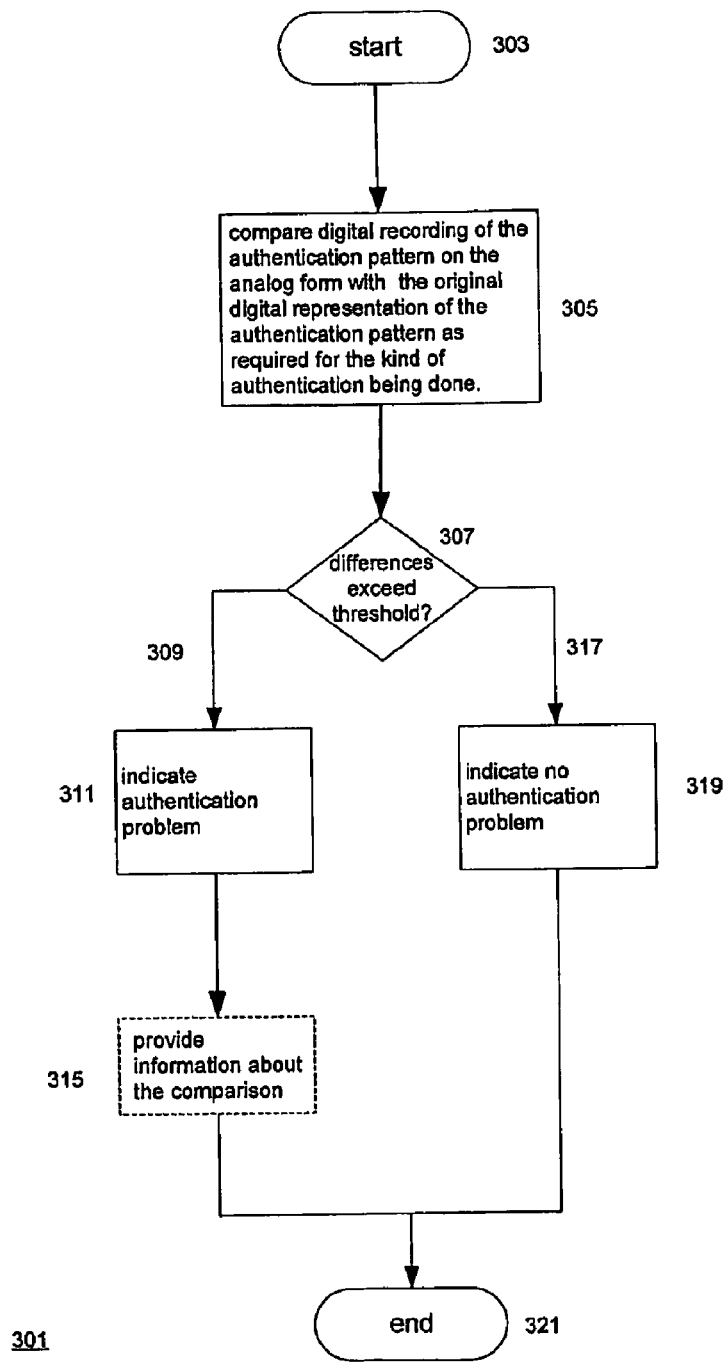
FIG. 3 is a flowchart showing in overview how a VAP can be used in authentication.

Using a Visible Authentication Pattern to Authenticate a Document: FIGS. 2 and 3

When a document that contains a printed VAP 119 is authenticated, the following happens:
 a printed VAP 119 is detected in the document.
 a digital recording of the detected printed VAP 119 is made.
 the digital recording of the printed VAP is compared with the original digital representation of the VAP; and
 authenticity is determined on the basis of the comparison.

The manner in which the digital recording of the printed VAP is compared with the original digital representation of the VAP depends on the kind of authentication being done; further, the authentication of a given document may involve several different kinds of comparisons being made between the digital recording and the original digital representation. For example, a digital recording of a visible authentication pattern on the amount field of a check may first be compared with the original digital representation to determine whether the check is a counterfeit and second to determine whether the amount in the amount field has been altered.

FIG. 2 shows detecting the printed VAP and making a digital recording of the VAP in a preferred embodiment. Both are done using the "Scanread" application program available from MediaSec Technologies. Other applications that detect a portion of a document and make a digital recording of it may also be employed. Scanread 201 uses black border 106 to detect the presence of visible authentication pattern 119 in printed document 117 and then makes digital recording 203 of visible authentication pattern 119. FIG. 3 shows a general flowchart 301 of a program that uses digital recording 203 and original digital representation 111 of VAP 119 to determine authenticity. Original digital representation 111 of the VAP may be the original itself, a copy of the original, or a new original digital representation 111 made in exactly the same way as the first original digital representation. Original digital representations obtained by any of these methods are of course exactly equivalent, and which method is used is a matter of implementation issues such as the cost of storage for the original digital representation of the VAP, the cost of transmitting the original digital representation of the VAP across a network, and the cost of generating the original digital representation each time it is required.

Beginning at 303, features of digital recording 203 and original digital representation 111 are compared at 305; what features are compared and how they are compared depends on the kind of authentication being done. If the differences between digital recording 203 and original digital representation 111 exceed a threshold (307), there is an authentication problem and branch 309 is taken. The threshold will also depend on the kind of authentication being done. In branch 309, the existence of a problem is indicated to the application program that is doing the authentication at 311. Where it is useful, the program may also provide information about the comparison (315); again, the kind of information and the manner in which it is provided will depend on the kind of authentication. For example, if the amount in the amount field appears to have been altered, the program may display an image that shows which of the pixels of the original digital representation appear to have been altered in the digital recording of the visible authentication pattern. If the differences do not exceed the threshold, branch 317 is taken. There, the fact that no authentication problem has been detected is indicated to the application program that is doing the authentication. Both branches and the program terminate at 321.

Using Visible Authentication Patterns to Distinguish an Original Document from a Non-Original Document: FIGS. 4, 5, One way a visible authentication pattern can be used to authenticate a document is by determining whether a document is an original, i.e., was printed from an original digital representation or is a non-original, i.e., was photocopied from document or was printed from a non-original digital representation, that is, a digital representation that was made from an unauthorized digital recording of a document. The reason a visible authentication pattern can be used in this way is that printing a document from its digital representation and making a digital representation of a document from a digital recording of it or photocopying a document always result in losses of information in the visible authentication pattern, regardless of how precise the printing, digital recording, or photocopying processes are; consequently, one can determine by comparing an original digital representation of a visible authentication pattern with a digital representation made by recording the visible authentication pattern from a document whether the document is an original or a non-original. In the case of an original document, the visible authentication pattern will have been printed once and digitally recorded once; in the case of a non-original document, the visible authentication pattern will have been printed and digitally recorded once to produce the original document from which the non-original document was made, and then, depending on how the non-original document was made, either photocopied or again printed and digitally recorded, resulting in a greater loss of information in the non-original document's visible authentication pattern than in the original document's visible authentication pattern.

The basic technique is shown in detail in FIG. 4. At 401 is shown how authentication using a visible authentication pattern works with an original document. Original digital representation 403 of the document contains an original visible authentication pattern (ovap) 405. Original digital representation 403 is then printed at 407 to produce original analog form 409. The printing operation causes loss1 in original analog visible authentication pattern (oavap) 411 in analog form 409. When authenticator 421 authenticates analog form 409, it makes a digital recording of oavap 411, resulting in loss2. The recording appears as roavap 415. Authenticator 421 then employs comparator 417 to compare ovap 406 with roavap 415. The difference between them is the sum of loss1 and loss2. That will be true when any otherwise undamaged roavap 415 is compared with ovap 405, and a difference of that size is a dependable indication that analog form 409 is indeed an original analog form.

At 420 may be seen how authentication works with a non-original document. The difference between the original document and the non-original document is that the non-original document is not printed directly from original digital representation 403 of the document, but instead from a non-original digital representation 423 of the document which has been made by digitally recording an original document 409 (422). As a result of the digital recording, the non-original visible authentication pattern 425 in digital representation 423 has suffered an additional loss of information which appears in FIG. 4 as loss3. When non-original analog form 429 is printed (427) from digital representation 423, another loss occurs in non-original analog visual authentication pattern 431, indicated as loss4. When non-original analog form 429 is authenticated by authenticator 421 as described above and moavap 435 made from noavap 431 is compared with ovap 405, the effect of loss3 and loss4 will show up as a greater difference between ovap 405 and movap 435 than there was between ovap 405 and roavap 415. Since noavap 431 in a non-original analog form 429 will always undergo the additional losses 3 and 4, the larger difference is a dependable indicator of a non-original document.

Non-original analog form 429 can of course be produced by any photocopying process as well as by the process of recording the original analog form (422) to make a non-original digital representation 423 and then printing (427) digital representation 423 to produce non-original analog form 429. The process of acquiring the image of original analog form 409 and then printing non-original analog form 429 from the image causes additional losses like those of losses 3 and 4, and consequently, moavap 435 produced in this fashion will still be less similar to ovap 405 than roavap 425.

Of course, if non-original digital representation 423 is itself made from a non-original digital representation, movap 435 will include the additional losses resulting from the photocopying or printing and digital recording of that non-original digital representation as well. Obviously, if loss1 and loss2 were fixed values, the detector could always determine correctly whether the document is original or non-original. However, in general some variation will occur for each loss, for instance some originals could be printed with a better quality (fidelity) than others. It seems then that a statistical approach to detection should be employed.

Figure 6:
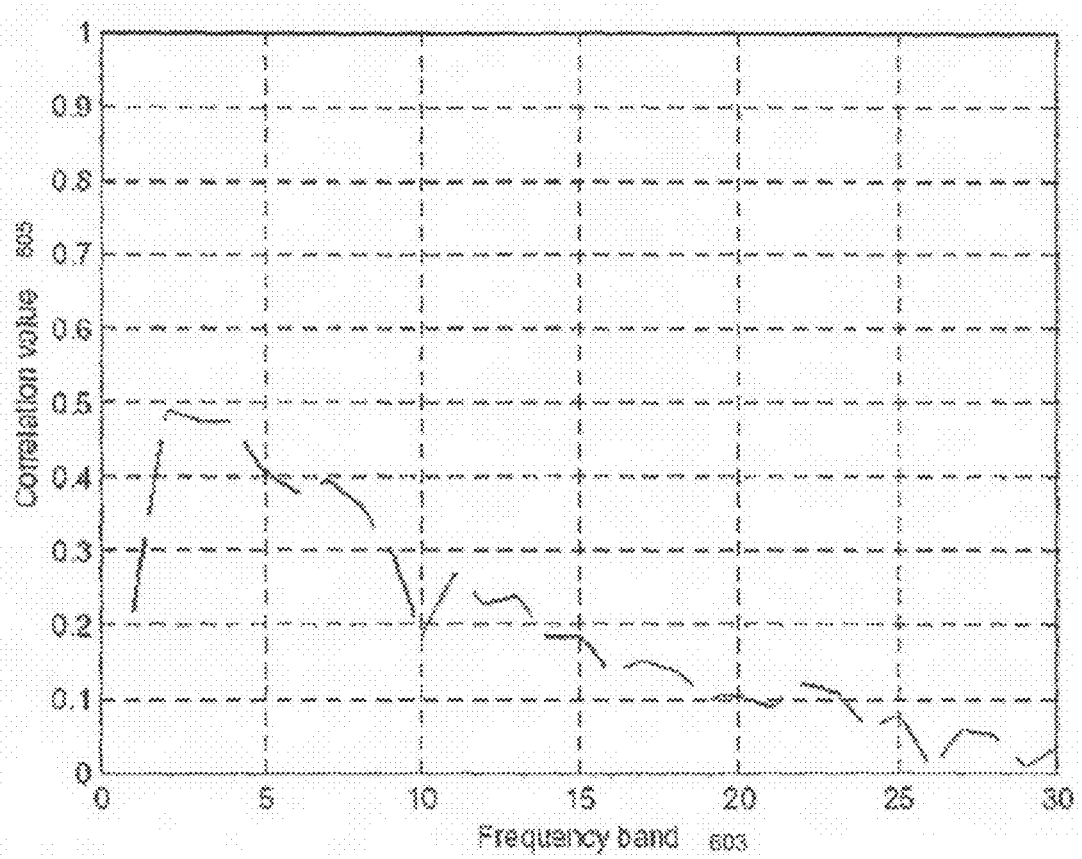
FIG. 6 is a graph showing correlation between energies in bands of frequencies in an original digital representation of a VAP and a VAP recorded from a non-original document.
Figure 7:
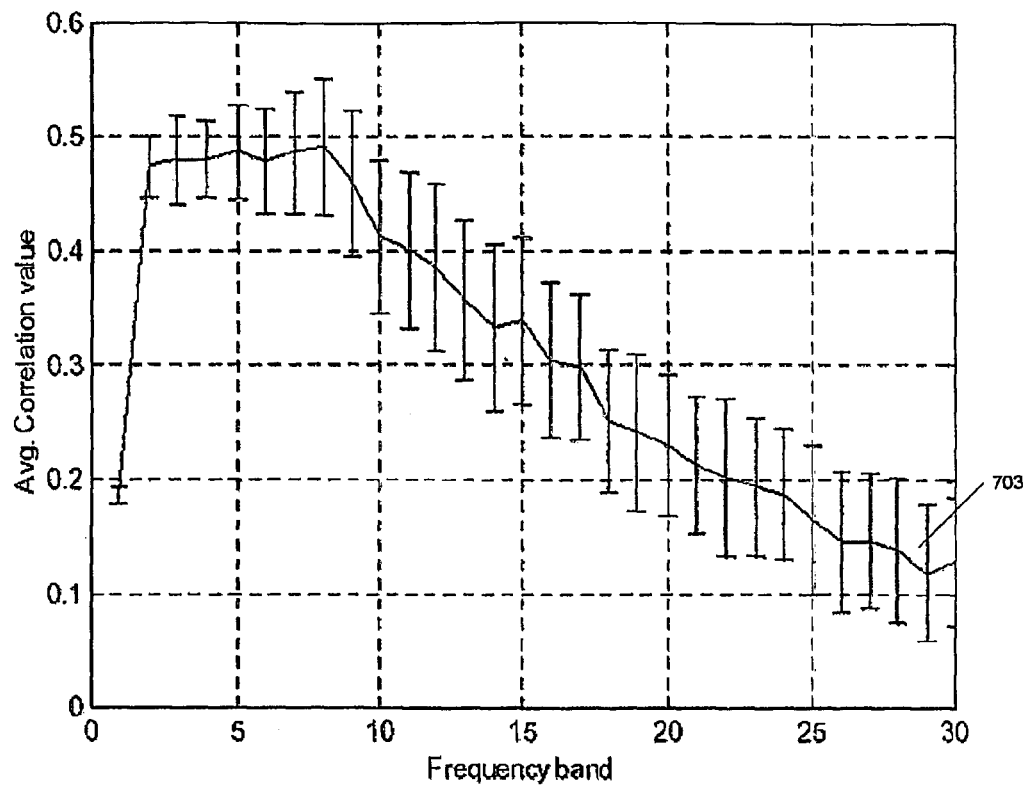
FIG. 7 is a graph showing correlation between energies in bands of frequencies in an original digital representation of a VAP and VAPs recorded from original documents.

Details of Distinguishing Between an Original and a Non-Original Document: FIGS. 6 and 7

An authentication technique is only as good as its reliability. The key to minimizing the probability of detection errors is the method for measuring how "different" a visual authentication pattern recorded from a document is from the original digital representation of the visual authentication pattern. The measurement method chosen must be based on properties of the VAP that are affected by the process of making a non-original document and must clearly distinguish an original from a non-original document.

Our approach is to consider the photocopying, recording, and printing processes as filters, more specifically as low-pass filters. Hence, high frequencies will be more attenuated than low frequencies by the printing and recording processes, and will lose more information at each record-and-print or photocopying step. For low frequencies in which a record and print or photocopying process preserves nearly all energy, a VAP in a non-original document may not have significantly less information the VAP in an original document. The very high frequencies may also not be helpful, since most of the energy at these frequencies in the VAP is lost the first time the VAP is printed. Consequently, even the VAPs of original documents contain very little information from those frequencies. Therefore, one must make an appropriate selection and/or weighting, of the frequencies used by the detector. The selection of frequencies for comparison, as well as the selection of a threshold for determining whether a document is original or non-original is typically done by training the comparison software on VAPs from original documents.

It should be pointed out here that the technique described above does not require a special visual authentication pattern. Instead, the entire document or a part of it can be used as the pattern. However, because many documents may not contain information at the energy levels necessary to determine whether a document is an original or a copy, it is better to use a visual authentication pattern which contains information at the proper energy levels. In the following, such visual authentication patterns will be termed copy detection patterns, or CDPs. The information in a CDP is distributed in appropriate frequencies. In a preferred embodiment, the original digital representation of the CDP is generated pseudo-randomly by a key, and consequently a program that has access to the key can create a new copy of the original digital representation of the CDP at any time. This key can be kept secret or revealed only to trusted parties. The copy detection pattern is inserted or printed on the document to be secured. In a preferred embodiment, analysis of a copy detection pattern from a document is done by digitally recording the document's CDP, using the key to generate a new copy of the original digital representation of the CDP, and comparing the recorded CDP with the original digital representation of the CDP. In other embodiments, the recorded CDP may simply be compared with a preexisting copy of the original digital representation of the CDP.

Algorithms Used in the Technique

This section describes the algorithms used for (1) generating an original digital representation of a CDP; (2) detecting and extracting a CDP from a document; (3) comparing the original digital representation of a CDP with a recorded CDP; and (4) determining whether a CDP is original or non-original. The manner in which the CDPs are compared in algorithm (4) and the thresholds for determining whether a CDP is original or non-original are determined by a training process in which algorithm (3) is used to gather training data.

Generating the Original Digital Representation of the CDP

The function make_pattern is used to create a digital representation (patten_img) of a copy detection pattern that may be identified with a source of the digital representation from which an original document is made. make_pattern generates a noisy gray-scale or color pattern. A black border may also be added to the pattern to facilitate its detection in the document. The CDP may optionally also display a logo. The logo will typically affect the lowest frequency bands, and its impact on detection will be therefore limited. Typical values are given in the explanation of parameters.

pattern_img=make_pattern(type, height, width, key, filenanme, border, logo_img, logo_weight).

Parameters for Pattern Generation
Required:
1. Type: type of generated random number values, e.g. 'randn' (gaussian N(0,1)), 'rand' (equiprobable distribution), 'randint (binary +1 or −1 distribution), or MD5, SHA algorithms (0-255 integer number). The random number values are then used to compose a grayscale or color image.
2. Height: height of pattern in pixels (e.g. 104).
3. Width: width of pattern in pixels (e.g. 304).
4. Key: integer-valued secret key or password used as a seed for the random number generator.

Optional:
5. Filename: name of the file in which the pattern image is saved.
6. Registration mark (e.g. black border added on the sides of the pattern image, dots added at the four corners of the pattern image).
7. Logo_img: image to be used as background logo, automatically scaled to the dimension of the pattern image.
8. Logo_weight: value between 0 and 1 to weight the energy of the logo image (e.g. 0.2), which is superimposed on the pattern image.

An Example of the Use of Pattern Generation Algorithm:
1. Generate pattern in a specific domain (e.g. DCT luminance or spatial in color RGB mode):
pattern=generate_pattern(type, height, width, key);
2. Transform the pattern to the spatial domain if the domain in the Step 1 is not spatial (e.g. inverse DCT):
pattern_img=transform(pattern);
3. If required round up pixel values p to integer values 0<p<255.
4. Combine logo with pattern, for example, the mixing following function can be: pattern_img=(1−logo_weight)*pattern_img+logo_weight*logo_img;
5. Add registration mark (e.g. black border).
6. Dump image.

A pattern image may consist of multiple components/channels such as Red, Blue, Green, or YUV, which can be produced as described in Steps 1 and 2 above.

To combine a CDP with logo or background image, various mixing functions can be adopted. For example when the CDP is merged with a barcode (image), the CDP replaces only the black area of barcode and leaves the white areas untouched.

Any shape (such as circle, oval) of the pattern image can be generated. A simple approach is to use a "shape mask" which defines an arbitrary shape represented by a two-dimensional array consisting of "1" and "0". Any shape can be created by applying the "shape mask" to the rectangle pattern image.

Detecting and Extracting the VAP from a Document

In this implementation, a digital recording of the document being authenticated is made and the black border on the VAP is used to locate the VAP in the digital recording. The black border results in a strong variation of luminance in the transition region, which is easily detectable. Other techniques for determining the location of the VAP may be used as well (e.g. existing features in the documents, black dots, etc.). Once the VAP has been detected, a digital representation is made of it which is comparable with the original digital representation of the VAP. This digital representation is the recorded VAP.

The original digital representation of the VAP and the recorded VAP are compared using the following function. The function measures an index that indicates how "close" the recorded VAP is to the original digital representation of the VAP. The original digital representation of the VAP can be stored in the memory of the detector, or can be re-generated if the parameters used to create the original digital representation and the function make_pattern( . . . ) are available to the detector. The optional parameters used when combining the pattern with a logo may not be required, because the logo generally affects the properties of the pattern only slightly. The function for doing the comparison is analyze_pattern, which returns Results, and may take different parameters depending on the scenario that is actually applied:

Results=analyze_pattern(type, height, width, key, . . . , test_img);

OR

Results=analyze_pattern(orig_img, test_img);

Parameters and output:
1. type, height, width and key: these are as explained for pattern generation.
2. test_img: test pattern image extracted from the document.
3. orig_img: original digital representation of the pattern
4. Results: contain all the results of the analysis For example, it may include different measures of correlation or statistics, computed for different elements of the images, e.g. different frequencies, different areas, different color channels, etc.)

The following example shows the steps of the algorithm the original digital pattern is regenerated and the subfunctions required for the algorithm:
1. (Optional) Remove the black border from the test CDP
2. Transform the test pattern image into the domain in which it was originally generated, for example, 8×8 block DCT:
test_pattern=transform(test_img);
3. Regenerate the original CDP:
pattern=make_pattern(type, height, width, key);
4. (Optional) Locally synchronize the test CDP with the original CDP as described below. (Optional) Apply certain image filters (such as sharpening) to the test CDP in order to produce a better correlation with the original CDP.
5. If required, convert the original CDP and test CDP into the domain where the comparison is to be made (e.g. 8×8 block DCT). Note that the comparison can be made in more than one domain, for example in both the spatial and frequency domains.
6. Compute several measurements of similarity between the original CDP and the test CDP for each channel in the transformed domain. For example, if patterns are generated and recorded in the color RGB domain, and the analysis is made in the 8×8 block DCT domain. Then there are 192 (i.e. 8×8×3) combinations by means of which the two patterns can be compared, and hence 192 measurements of similarity can be performed. The measure of similarity can itself be computed in several ways, for example by binning values and keeping only the one where there is a higher correlation, in order to exclude areas of the test CDP that may have been corrupted.
7. Collect and combine all similarity measures or measures based on other image features, in order to measure one or more indices of quality or of the "closeness" of the test CDP to the original CDP. The combination function can be any function that combines the different inputs, for example a function that combines similarity measures by assigning more weight or importance to features that are better discriminants between the original CDP and the test CDP.

As already explained above, a duplication process will always degrade the original CDP, and in general it is expected that the different measures of closeness or quality will be lower for a CDP that is recorded from an analog form. However, due to statistical variations, an adequate selection and combination of the different measures can be more effective in determining whether a test CDP is recorded from an original analog form or from a non-original analog form.

FIG. 6 shows the correlation (shown at 605) between the energies of the frequencies in the original CDP and the test CDP from the document being authenticated for thirty bands of frequencies (shown at 603). As expected, the correlation between the energies is highest in the low frequency bands from which little information is lost in the copying process and lowest in the high frequency bands where even a single printing operation causes the loss of most of the information. If the correlations are substantially lower in the middle frequency bands than they would on average be for CDPs from original documents, the CDP is not an original, and therefore neither is the document being authenticated. That is the case for the plot of FIG. 6, which thus shows that the document being authenticated is not an original.

Other image features can also be considered when the correlation values by themselves are not sufficient to determine whether a document is an original analog form or a non-original analog form. Additional image features which can be used for producing correlation values between the original CDP and the test CDP include color histogram
edge, line and outlines
frequencies in other domains (such as Fourier and Wavelet domains)
brightness and contrast Detecting Whether a CDP is from an Original or a Non-Original Document The function detect_pattern analyzes the results returned by analyze_pattern and returns the value Output, which indicates whether a CDP is from an original document or a non-original document.

Output=detect_pattern(Results, Parameters)

Results: can be a scalar value or a vector, the output of the function analyze_pattern.

Parameters: values required to adjust the behavior of the detection function, which may depend on the requirements of the application and the conditions under which it performs detection.

Output: different output values are possible. In its simplest form, Output may take three values: ORIGINAL, NON-ORIGINAL, or PROCESSING-ERROR. The last output may occur when the pattern is badly recorded. Output may return more detailed information, for example, NON-ORIGINAL can further indicate how the test pattern from the non-original document was produced (e.g. duplication, photocopy, regeneration, etc.). Output can further provide indexes of quality or closeness.

Here is an example of the algorithm for a simple detection function:
1. Combine the various Results values returned by analyze_pattern to obtain a scalar value S. One way of doing this would be to make S by summing the returned Results.
2. If S>T1 then output is ORIGINAL, else if S>T2 then output is NON_ORIGINAL, else the output is PROCESSING ERROR.

Here T1, and T2 are two scalar parameters typically obtained via a training process, with typically T1>T2.

Local Resynchronization of the CDP from the Document with the Original CDP

In order to compare the CDP recorded from the document with the original CDP, the recorded CDP must be synchronized with the original CDP. One way to do this is to use synchronization points in the recorded CDP, for example, black border 601, to synchronize the original. Once the CDPs are synchronized, the comparison between them is done pixel-by-pixel or block by block.

When there have been errors in printing the CDP in the document or in the digital recording of the CDP from the document, the CDPs cannot be perfectly synchronized by this method. For example, there might be less than a pixel shift between the original CDP and the one recorded from the document. Furthermore, the shift may vary along the pattern: in some cases the upper part of the recorded CDP may be shifted downward compared to the original CDP and the lower part be shifted upward (or vice-versa, of course). These shifts may be very hard to notice, may not occur consistently, and may vary locally in the recorded pattern. They are generally caused by slight instabilities in the printer, but can also be caused by similar instabilities in the recording device.

These unpredictable sub-pixel shifts may reduce the detector's performance: because of these misalignments, some CDPs from original documents may be detected as being from non-original documents. One method of handling these "pathological" CDPs from original documents, and in general of improving the stability of the CDP detection is to locally resynchronize the CDPs in order to correct the local misalignments. There are several ways to perform local resynchronization, but the general idea is to use the recorded CDP itself for local resynchronization.

One way to perform local resynchronization is to divide the original CDP into blocks (non-overlapping blocks are preferred, but the blocks could also overlap) and find which block of the recorded CDP has the closest match with a given block of the original CDP. If there were no misalignment, the block of the recorded CDP that most closely matched the given block would be at the same position in the recorded CPD that the given block had in the original CDP: for example, the best match for the 10×10 block with starting position (80,80) and ending position (89,89) of the original CDP would be the corresponding block (80,80) to (89,89) of the recorded CDP. However, if there is a misalignment, the best-match could as well be with block (81,80) to (90,89) (shift of one pixel to the right). If that is the case, then the recorded pattern will have the block (81,80) to (90,89) shifted 1 pixel to the left, to position (80,80) to (89,89). The same idea can be applied to each block in the recorded CDP, to produce a "locally resynchronized" CDP.

Local resynchronization requires a couple of parameters and functions. First, we must define a measure of distance between each block of the original CDP and a block of same dimensions of the recorded CDP. A convenient measure for this purpose is the standard correlation coefficient. It is also necessary to set the dimensions of the blocks into which the original CDP is divided: typically a block of dimension 8×8 or 16×16 can be used, but in general blocks of size N×M can be used. As mentioned earlier, blocks can be overlapping, in which case the amount of overlap between successive blocks needs to be defined. Another parameter to set is the search range or search area: starting from matching positions, how far should the algorithm look for a matching block? This is set with a parameter n, where for block starting at position (xy) of the original CDP, all blocks with position (x+/−i,y+/−i), 0<i<n, are tested.

It is also possible to scale the digital and recorded CDPs before doing local resynchronization: this allows a finer grain match. For example, by scaling the two CDPs by 2, we can recover half pixel shifts. And finally, the synchronization algorithm can be applied iteratively on the resynchronized CDP until no further improvement is found.

Once the resynchronization is performed, an arbitrary measure of similarity/distance between the resynchronized recorded CDP and the original CDP can be performed. A simple correlation, or a local frequency analysis can be performed, perhaps with parameters based on a training set. These measures, which typically make an average of certain quantities on the whole CDP, may however not always be robust against some local damage to the scanned CDP that may occur in certain applications. For example, in some cases one area of the CDP may have been badly printed, or may have been damaged by scratches, writing, or water. In other cases the scanning device may have inserted distortion into the scanned CDP; that problem typically occurs with feed-through devices when the document is not correctly inserted. To make the CDP more robust against these kinds of distortion, more robust measures of similarities may be used: one such measure is the median local correlation coefficient, where a correlation coefficient is computed for each block of the CDP, and the median of all local correlation coefficients is computed. Here, computing a median instead of an average makes the detector significantly more robust to local alterations. To cope with a larger amount of corrupted areas in the CDP, it is also possible to compute the average of only the 20% best local correlation coefficients, which can be assumed to be non-corrupted. In one implementation, this procedure of computing is this sort of "biased" average is applied separately to each frequency channel, and optionally to different color channels. Of course, the foregoing synchronization techniques can be applied not just with CDP's, but with any recorded visible authentication pattern that needs to be synchronized with an original visual authentication pattern.

Applications of CDPs

CDPs can be used in any situation where it is useful to distinguish an original document from a non-original document. A CDP may be printed by any process which prints the CDP with sufficient fidelity so that a digital recording of the CDP is comparable with the original digital representation of the CDP. The pattern may be particularly adapted to detect non-original documents made by particular photocopying, scanning, or printing techniques. Particular uses of CDPs include:

1. Printing a CDP on packaging for brand protection
2. Printing a CDP on checks and currency for copy detection
3. Printing a CDP on valuable documents including certificate, contracts, and the like for verifying whether the document is the original or a copy.
4. Printing a CDP on holograms
5. Printing a CDP on labels on valuable goods such as aviation/automobile parts or pharmaceuticals.

More generally, a CDP may be used in any application where it is desirable to be able to determine what processes have been applied to a document. The pattern may of course be varied as required to best detect the processes of interest.

CDP can also be used for the following applications:

1. Benchmarking of Printing Quality

When reading the CDP, a quality index of the digital recording of the CDP is computed. This quality index will vary on printing quality, paper/substrate quality, or digitization/scanning (device) quality. The CDP quality index can then be used to quantify the quality of a certain printing process, a certain substrate or a certain scanner.

2. Quality Control

In the same vein, a CDP reader can be used in a printing production process for automatic quality control. The advantage of the CDP over manual inspection is that it gives an automated, objective, and precise measure of quality.

3. Tracing

The CDP has a structure and characteristics that is associated with the printer, paper, camera, and usage and wearing. In principle, analysis of the CDP can determine the general "history" of the document: how it was printed and what "wear and tear" it has suffered.

Implementation Details of the VAP

Form of the VAP in the Document

Figure 8:
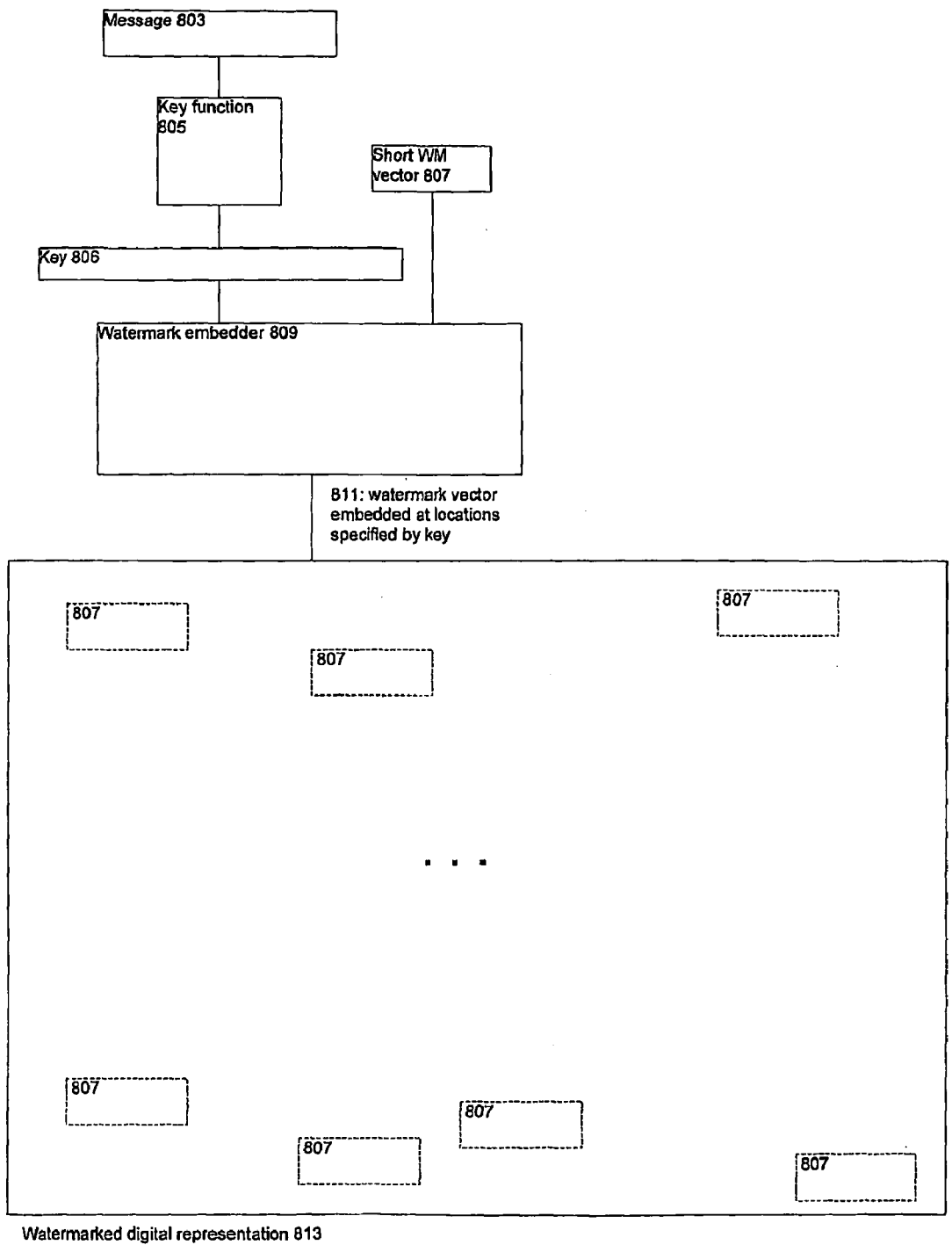
FIG. 8 shows how a message-based key can be used to embed a contentless watermark in an image.

All that is required for using a VAP to detect alterations in an analog form is that there be an area in the analog form that has a pattern which will serve the purpose and an original digital representation of the pattern that can be compared with the pattern as recorded from the analog form. It will thus be possible in some cases to use a preexisting pattern in an analog form for the technique. More usually, though, the VAP will be included as part of the design of a new analog form. There is of course no need to hide the VAP in the analog form, and indeed in some cases, its presence may be advertised to reassure customers that illegitimate analog forms can be detected. On the other hand, the VAP can have any shape, and thus can easily be built into other features of the analog form. FIG. 8 shows two examples. At 801 is shown a barcode whose bars make up the VAP. At 803 is a logo which contains the VAP. There may of course be more than one VAP in a document and more than one VAP may share a location. This can be done by giving each pattern a weighted value such that the weights of all of the patterns sum up to one, e.g.:

$$\text{Final pattern} = a^*\text{pattern1} + (1-a)^*\text{pattern2}, \text{ where } 0 < a < 1$$

One application of multiple patterns would be the authentication of contracts, where each party adds its own pattern when it signs the contract or otherwise terminates a stage in the negotiations.

It is also possible to insert several CDPs on a document at different places, typically produced with different keys, to enable multiple parties to verify their own CDP without being able to verify the CDP of the other parties (and consequently being able to duplicate them). It is even possible to generate a CDP using different keys (each key may control different spatial or frequency area of the CDP), to enable different parties to verify the CDP. This way, if one party releases his key, this key is not sufficient to make an exact duplication of the CDP (all keys are necessary), and the security is not compromised. This is analogue to the concept of "Shared Secrets".

Registration of the VAP

The preferred embodiment employs black box 106 as registration for the VAP. However, many other registration techniques are possible. For example, one could use visible patterns such as frames, bar codes, or the like already displayed on the package to locate the VAP, as well as OCR. One can also use UV marks or any techniques discussed in U.S. Pat. No. 6,782,2116, Zhao, et al., Apparatus and methods for improving detection of watermarks in content that has undergone a lossy transformation, issued Aug. 24, 2004. Also, one could also make the Fourier-Mellin transform of the recorded VAP and match it with the VAP's original digital representation.

For some applications, it is difficult to know if the orientation of the digital recording of the VAP is correct, or if it should be flipped upside down (180 degrees rotation) before reading. To avoid having to analyze the VAP one time, and then, if the analysis is not successful, to rotate it in the opposite vertical orientation and analyze it again, it is possible to design a symmetric VAP: the lower part is a mirror of the upper part. The VAP can then be analyzed independently of its vertical orientation.

Properties of the VAP's Pattern

The pattern can be a grayscale pattern or it can be a colored pattern. In the latter case, different color channels can be employed, for example RGB and YUV. The pattern can also be generated in various frequency domains, for example spatial, wavelet, DFT, or DCT domains.

Generating the VAP

The noisiness, i.e., random nature, of the VAP is what makes it difficult for counterfeiters and forgers to deal with it. Any technique which can produce a random or pseudo-random pattern will do to generate the VAP. In the preferred embodiment, generation is done by providing a value to a pseudo-random number generator which generates a sequence of random numbers that is unique for the value. The value thus serves as a key which may be used to generate new copies of the pattern. Different pseudo-random number generators may be used in different embodiments and the probabilistic frequency values for the generated random numbers can be taken from different probability distributions. The key can also be used to determine the locations in the VAP upon which analysis is performed. As will be explained in the discussion of using the VAP to carry other information below, the key may include such other information. In some applications, the key used for designing the pattern may not be revealed to other parties. In that case, any useful way of distributing keys may be used, for example asymmetric keys or public-private key pairs.

The pattern may be combined with a logo, either by adding the logo to the pattern or vice-versa. The logo can be any existing image or document, including images serving other purposes (a 2-D bar code, a watermarked image, etc.). It is also possible to apply any process such as filtering to the pattern or to the logo in such a way that the logo will minimally interfere with comparing the recorded VAP with the original digital representation of the VAP.

Printing the VAP

The quality of the authentication provided by a VAP depends completely on the fidelity with which the VAP is printed on the document. Authentication errors can be reduced if a "quality control" step is added at the end of the printing process to guarantee the fidelity of the VAP:

1. each printed VAP will be passed to an automatic verification process to check if the authentication pattern has the minimum quality which is required for it to be recognized as an original.
2. If the quality is below the minimum quality, an alert will be issued and the document/package containing the authentication pattern will be re-printed
3. Such verification can also serve as a "quality control" for printing quality or errors introduced by the printer.

The generation of the VAP can be adapted to the printing technology. For example, if a laser printer printing only binary dots is used, then a binary dot VAP can be generated to better use the possibilities of the printer. Also, a VAP might be more adequately generated, and printed, in the color space of the printer. If a certain printer uses specific inks (e.g. CMYK), it can be more effective to generate the VAP in that domain than in the RGB domain. If the VAP is engraved in metal with a laser engraver able to produce only binary dots, then it would make more sense to generate a binary VAP.

Using the VAP to Carry Other Information

Three approaches to using the VAP to carry other information are discussed in the following: reserving certain areas of the VAP to hold information, using the other information to generate the key used to make the original VAP, and adding a watermark to the VAP. The disadvantage of adding a watermark is that it reduces the ability of the VAP to detect non-original analog forms or modifications in the VAP.

Reserving Areas in the VAP to Hold Information

Certain areas (e.g. 8×8 blocks) of the VAP can be reserved to hold information. In those areas, the structure/characteristics of the VAP are not actually used to verify its authenticity, but to store some bits of information. These areas can be selected pseudo-randomly using a key, such that an entity which does not have the key cannot determine whether an area in VAP is actually used to store information or to determine the authenticity of the VAP. In an area that is used to hold information, a certain structure/characteristics of the VAP can correspond to a certain bit value ('0' or '1') of information. These bit-dependent structure/characteristics can of course vary as determined by the key. Note that the reserved areas and the information they contain are part of the VAP as generated. They thus do not degrade the ability of the VAP to detect unauthentic documents. One use of the reserved areas is to store the key used to generate the VAP.

Using the Information to Generate the VAP's Key

This discussion uses the following terminology: The VAP is created and detected with a key P; we may want to use a different key S to embed a message in the pattern as described either above with regard to the reserved areas or below with regard to watermarks; a message M is embedded in the VAP using the key S; finally additional information I might be printed visibly on the document (serial number, barcode, etc.), or UV-coded invisibly, within the pattern or outside of it, or be obtained from an external source.

Fixed Pattern Key

In one embodiment, the VAP creation key is fixed P. This is typically the case for standard offset printing technology, where the printing technology does not have the ability to change the pattern dynamically for each package/product/document. The key can be kept secret as described above or may be incorporated into other security features. For example, it could be printed in UV inks on the document. The fixed pattern key can be used for brand protection or document protection generally.

Variable pattern key In another embodiment, the VAP's key depends on a secret key S and some other information I. This other information I may be displayed on the document (within the pattern or outside of it) or obtained from an external source. The information from the document can be for example a serial number, a text, a barcode etc. Information from an external source may for example be a value that is associated with the VAP and known to the person who is checking whether the document containing the VAP is authentic. The pattern key may be any arbitrary function $P=f(S,I)$ of the parameters that are the secret key and the information I. A simple function would be to concatenate or sum the two parameters, but many other functions are possible, such as a hash value of a combination of the two parameters, etc. At detection time, the printed information I is extracted with an appropriate technology—bar code reader, OCR, etc—. Then the pattern key is generated as $P=f(S,I)$, and the pattern is analyzed. Typical uses include brand protection with digital printing.

Watermarks in the VAP

It is possible to embed a visible or invisible watermark in the VAP using any watermarking technique. The watermark may serve multiple purposes. It may contain any information, including only a single bit, as described above, or aid registration of the pattern. The watermark can either be detected with the key used to generate the VAP or with another key such that its reading is restricted to another user or group of users. A third possibility, explained below, is to use the message carried by the watermark to derive the key used to generate the VAP.

When a digital watermark is embedded into to a VAP, the VAP will be slightly modified. As a result, when the same VAP is used for authenticity verification, its reliability for that purpose may be reduced. As an alternative, the digital watermark can be embedded into areas in the VAP that are reserved to store information as explained above.

Watermarks and Keys

In another embodiment, the pattern creation key P is derived from the secret key S and the message M embedded as a digital watermark in the copy detection pattern. In this case, M takes the place of the information I used to create the variable pattern key discussed above. At creation time, the pattern key P can be any function of the secret key S and the message M, g(M,S). The pattern is generated in the usual way, then a watermark is inserted into the pattern, where the watermark encodes the message M using the secret key S as a parameter. At detection time, first the watermark message M must be read from the pattern with the secret key S. Once M is known, the pattern key P=g(M,S) is derived, and the pattern is analyzed.

In this application framework, no auxiliary technology would be needed to extract more information printed on the package. It is however possible to also use the information I printed on the package in several ways within the principle described here. For example, the secret key S can be used in combination with the information I to produce a watermarking key W, i.e. h(S,I)=W, which is used to embed the message in the pattern. Then the pattern key is generated in the same way as before, P=f(M,W)=f(M,h(S,I)). In general, VAPs may be combined with watermarking technology and other reading technology (OCR or barcode readers, for example), are to produce different levels of verification.

Comparing VAPs

How recorded VAPs are compared with original digital representations of VAPs will depend on how the VAP is made and what its purpose is. Some generally-applicable variations include evaluating certain areas independently, either to have more clues on what process has been applied to the document or for security features. As described above, a VAP may contain more than one authentication pattern, and the different patterns may be analyzed by different groups.

Before VAPs can be meaningfully compared, the comparison program may have to be "trained" with VAPs recorded from original documents, as described above for CDPs. The training establishes the thresholds for determining whether a VAP recorded from a document whose authenticity is being examined is authentic or not. The meaning of the threshold will of course depend on the kind of alteration that the VAP is being used to detect. Retraining is required whenever the manner in which the original documents are printed varies in a manner which affects VAP comparison. Training can be done automatically by printing a number of VAPs on a sheet of paper, scanning the sheet, and providing the scan to training software.

In another embodiment, instead of comparing the digital recording of a test VAP to a corresponding digital representation to measure its quality index, it is possible to compare the digital recording to a digital recording of another VAP (typically an original VAP that was scanned).

Environments in which VAP Analysis is Performed

What is required to do VAP analysis is a device that can record the VAP from the document to make the recorded VAP, a copy of the original digital representation of the VAP, and a processor which can compare the recorded VAP with the original digital representation of the VAP. The recorder and the processor may be local to one another or connected by a network. The network may be either a local area network (LAN) or a wide area network (WAN). An example of a local environment is a processor is a PC that has a scanner, a copy of the analysis code, and a copy of the original digital representation of the VAP. The copy of the original digital representation of the VAP may either be downloaded, pre-stored locally, or generated locally using a key. Results of the analysis are output to the PC's display device.

In a network environment, scanning, analysis, and the original digital representation of the VAP may be distributed across the network in any fashion. A distribution that maintains the security of the original digital representation of the VAP and simplifies the equipment needed at the local level is one in which scanning is done in a device which is connected to a WAN. When the VAP on the document has been scanned to produce the recorded VAP, the recorded VAP is sent to a location in the WAN at which both the analysis code and an original digital representation of the VAP are available. The original digital representation may be either stored or regenerated on demand. The analysis is done at that location and only the result of the analysis is returned via the WAN to the device used for scanning. In network environments generally, information carried in or sent with the recorded VAP may be used to retrieve information for use in the analysis. For example, the document may contain a serial number, and the serial number may be sent with the recorded VAP to the location that does the analysis. If there is an association between VAPs and serial numbers, the serial number could be applied to a database at the location or elsewhere in the network to retrieve the either the key for the original digital representation of the VAP that should be compared with the recorded VAP or a copy of the original digital representation of the VAP itself. As described above, the serial number could be specified in a barcode that contained the VAP, as a visible watermark in the VAP, could be OCR'd from the document, or even could be input by the person doing the scanning.

A camera (webcam, camcorder, etc.) can be also used to capture images of the VAP. In this case, the VAP detector receives not only one image as input, but a constant stream of images. The additional information provided by several images can potentially be very useful in the analysis. However, as the time required to analyze one image can be significantly larger then the time between two successive images, the use of the stream of images can be optimized. For example, images that appear to have the properties for a correct reading (good sharpness, VAP wholly contained in the picture), can be selected from the stream and used for analysis.

Combination of VAPs with Other Security Technologies

A VAP can be combined with other technologies targeted at making analog forms more secure. For example, the VAP can be used with information hiding techniques such as digital watermarking, with machine-readable information such as 1-D or 2-D bar codes, with holograms, or with any other technology that can be applied to an analog form. The relationship between technologies can be multifarious: as an example a 2-D bar code can contain independent information, or the secret key needed for the pattern analysis, or inversely, the VAP can hold the key required for decoding the 2-D bar code or the 2-D bar code can contain the VAP.

Detecting the Position of a VAP

When an analog form is scanned, it is not always possible to know where the VAP is located at the beginning of the scan. This may be because the application using the VAPs has to support documents with different formats and/or VAPs placed at different locations, because the end user who places the document on the scanner does not know how to place document on it; a portable camera/computer equipped with a camera is used to capture an image of the document, and there is an inherent human variability in the image capture; or simply because there is a natural variability in each scan and patterns in the document close to the VAP interfere with the VAP. In one "worst case application", the full area of a letter-size analog form is scanned, and the VAP can potentially be located anywhere and with any orientation on the analog form.

Figure 13:
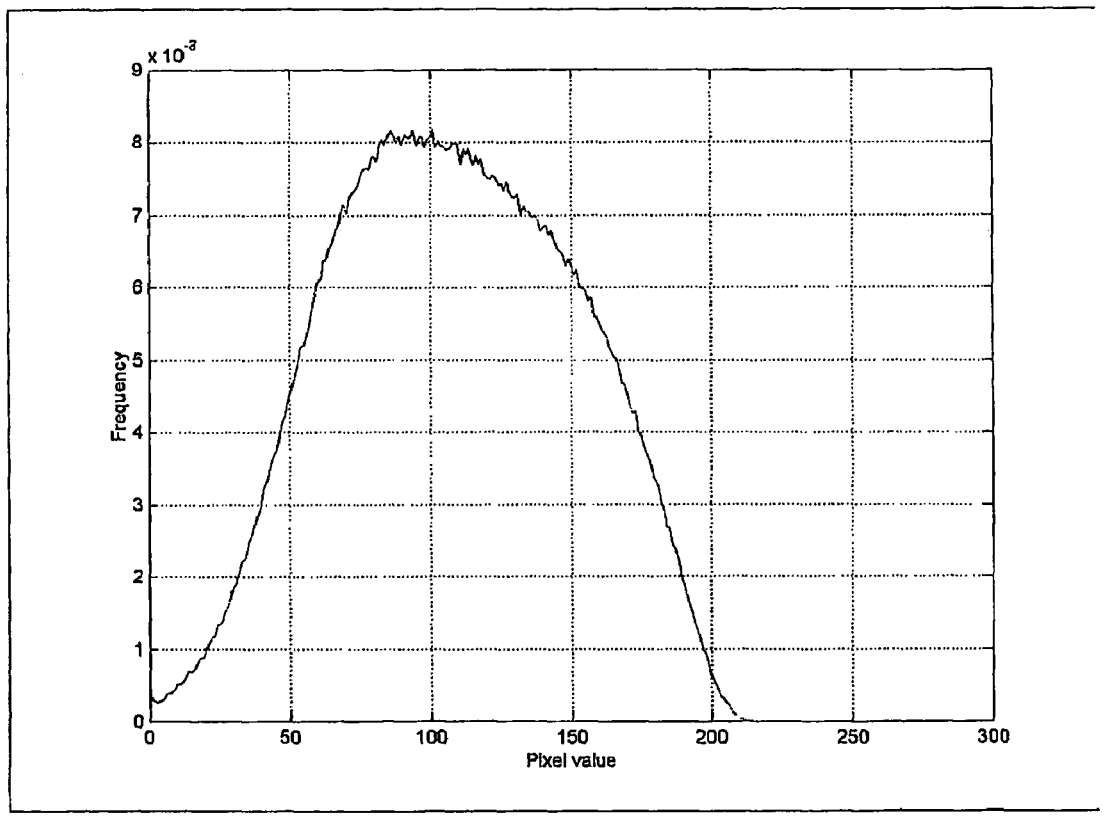
FIG. 13 shows a template histogram with a distribution with an average distribution.

It is however possible to take advantage of the general statistical properties of the VAP to locate it in the analog form. The property that distinguishes the VAP from most other image or document features is the spreading of its histogram. Because the VAP is noisy, each of the pixel values (256 for a grayscale image; 2 for a binary image; 24-bit or greater number for color image) of an original digital VAP is in general equally probable, or may have a specific distribution. Though the printing and scanning of the VAP does modify the distribution of its pixel values, the modifications thus produced are highly specific. By printing and scanning a certain number of VAPs in the calibration process, it is possible to make a histogram which is an estimate of the average distribution of pixel values in a VAP scanned from an analog form. FIG. 13 shows one such distribution 1301, which is called in the following the "template histogram". Because of the noisy nature of the VAP, the distribution of pixel values in the template histogram will in general be much wider than the distribution of pixel values in the document generally The image of a scan of a document can be divided in blocks, typically of size 50×50 pixels. For a letter-size scanner scanning at 300 dpi, the scanned image of 3300×2550 pixels is divided into 66×51=3366 blocks. The histogram of each of these 3366 blocks is computed, and correlated to the template histogram. As would be expected from the non-random nature of most portions of a document, it has been empirically observed that most blocks in the image of a scanned analog form have a histogram with a near zero correlation with the template histogram, while the blocks of the VAP have a significantly positive correlation with the template histogram. The block with the highest correlation with the template histogram can generally be assumed to belong to the VAP, especially if the neighboring blocks also exhibit a high correlation. A local search algorithm can be applied to detect all the neighboring blocks that belong to the VAP, and the area containing the VAP can then be cropped and given as input to the restoration function.

The above approach requires having enough knowledge of the given printing-scanning environment to produce the template histogram. It might not always be possible to have such knowledge; in that case, the characteristic high entropy of a VAP can be used to detect it. As used here, entropy is the probability that a pixel in a block of a grayscale image will have a one of a large number of different values. In a block that contains print (printed text or graphics), for example, the pixels will typically be concentrated around two values, i.e. near white if they represent paper and near black if they represent print, and thus the probability that a pixel will have one of a large number of values is low and so is the entropy. Because the VAP in a digital representation is noisy, there is a high probability that a pixel in the VAP will have one of a large number of values, and the VAP's entropy is high. Though the entropy of the VAP in the digital representation is decreased by printing-scanning, it is often the case that areas with the VAP remain the areas in the scanned image with the highest entropy. Therefore, by measuring the entropy in each area of the scanned image and selecting the area with highest entropy, it is possible to derive the location of the VAP without the use of a template histogram.

In some cases, this approach does not work because the digital representation containing the VAP includes other highly textured areas in which the texture and therefore the entropy have been better preserved during the printing-scanning. In this case, one way to avoid detecting such areas is setting some restrictions on the set of possible pixel values that enter in the computation of the entropy. For example, if VAPs often have pixel values between 0 and 150 in the scanned image, one can exclude from the computation of the entropy all pixel values that have a luminance higher than 150. One can of course specifically design the VAP to have a range of values that is different from the range of values in the textured areas.

Other properties of the VAP, for example, its size, its location relative to other security features or the property that it is printed in a specific ink, can be used as additional factors to further discriminate VAP areas from non-VAP areas.

This method may not work to locate copies or counterfeits of lower quality, because the VAP properties can be highly perturbed. In that case, another approach is to take advantage of the fact that the VAP has generally much more dynamics than any other parts of an image, even if it is copied. To measure the "dynamics" of an area (of e.g. 50×50 pixels), one could measure the average difference between a pixel and each pixel in the neighborhood.

For any method used, once a block is identified as being part of the VAP, it is still necessary to make a search around that block for all other adjacent blocks that also belong to the VAP. Any local search algorithm can be used to find a set of connected blocks with a given property, where the property is that the block has a "significant" output to the function described above.

Figure 10:
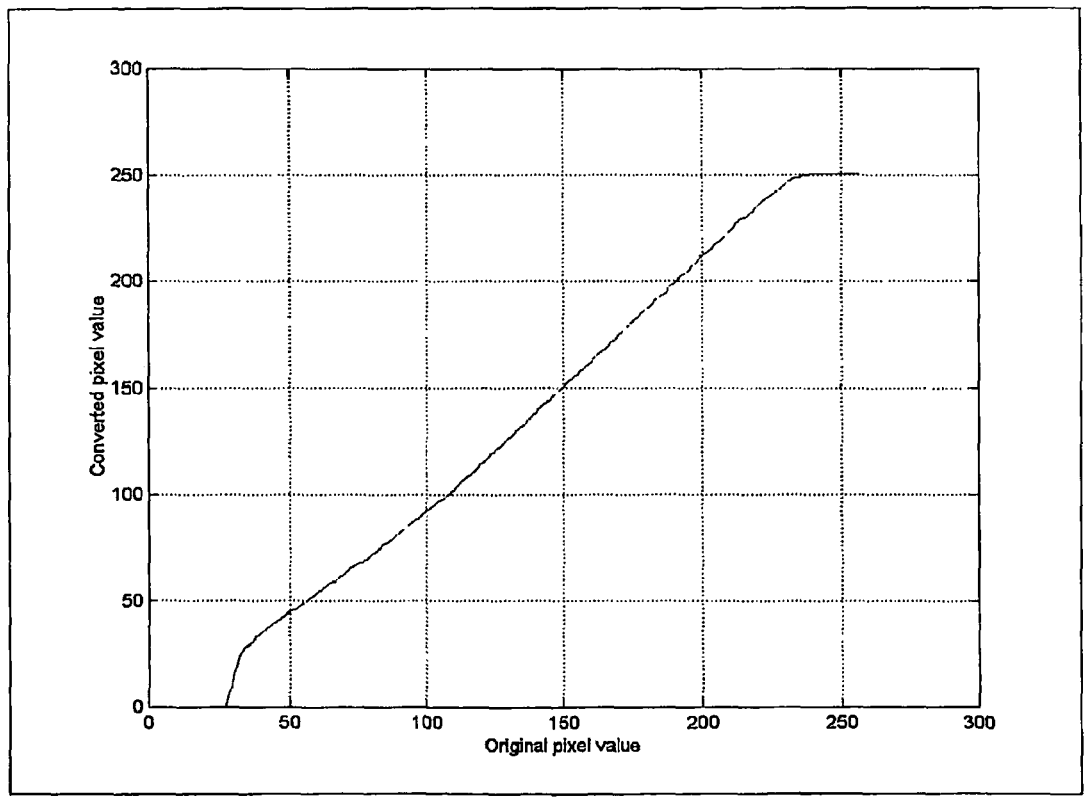
FIG. 10 shows an example histogram conversion function.
Figure 11:
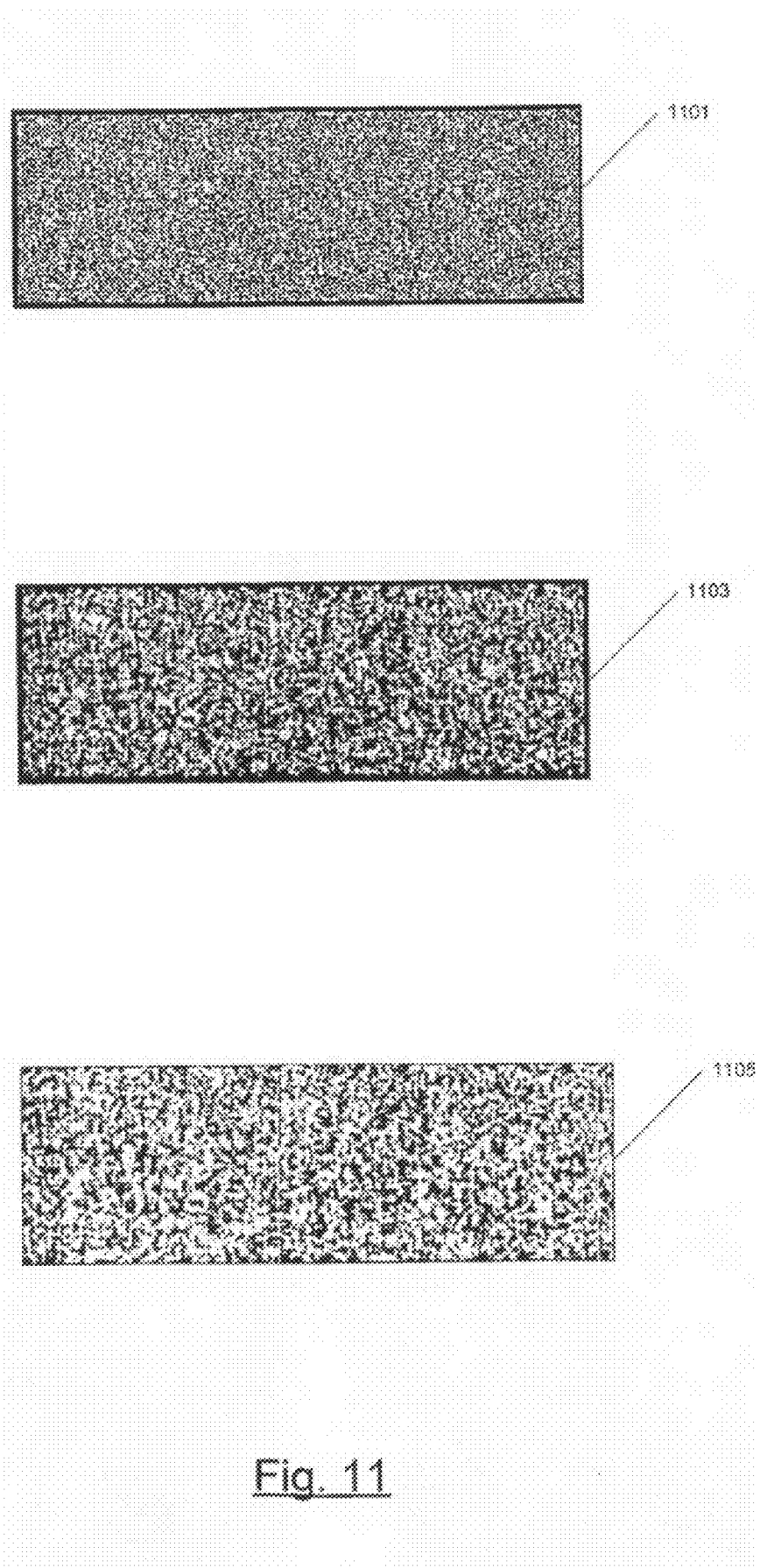
FIG. 11 shows the effect of a histogram conversion on a scanned restored CDP.

Using the CDP to Detect Non-Original Digital Representations and Non-Original Analog Forms FIGS. 10 and 11

The effect of printing and scanning can be seen as corresponding essentially to adding a certain amount of random noise to each pixel value of a document and the document's CDP. As an analog form is always evaluated after it has been printed and scanned, it is expected that more noise will have been added by the printing and scanning process to a non-original analog form than to an original analog form. For this reason, it is in general possible to distinguish between an original analog form and a non-original analog form by measuring the simple difference between the digital original of the CDP and the CDP from the scanned analog form in the spatial domain. A higher distance would be expected if the CDP is from a non-original analog form. A pixel located at column i and row j, x(i, j) an y(i, j) are respectively the pixel value for the digital original and the test pattern, a measure of distance between the digital original and test pattern is:

$$D = \operatorname{Sum}\_j \operatorname{Sum}\_i |x(I,j) - y(I,j)|^p / (N*M)$$

Where p is an arbitrary positive number, and N and M are the width and height on the patterns in pixels. As stated above, the distance D will always be higher for an original than for a copy.

Though it can be proven mathematically that the above measure is nearly optimal for discriminating copies from originals, it is not applicable without some processing of the CDP from the analog form. The reason is that printing and scanning results in non-linear transformations of the pixel values in the analog form. These transformations vary with the printer and scanner, and even with the printing/scanning parameters. Generally, the spectrum of the CDP pixel values from the analog form will be compressed by the printing scanning sequence with extreme values from the spectrum of the analog form's CDP being much rarer than in the CDP from the original digital representation.

This problem can, however, be overcome by applying a histogram conversion function to the CDP from the analog form. The histogram conversion function modifies each individual pixel of a CDP from an analog form, such that its histogram is equivalent to the histogram of the CDP from the original digital representation. This transformation function is generally estimated using a set of printed CDPs in the calibration step. The transformation function is generally fixed, and is applied to each CDP from an analog form. FIG. 10 shows an example histogram conversion function at 1001. FIG. 11 shows the effect of applying the histogram function to a CDP from an analog form. The CDP from the original digital representation is shown at 1101; the CDP as scanned from the analog form is shown at 1103; the CDP 1103 as corrected by the application of the transformation function is shown at 1105. As is apparent from FIG. 11, corrected CDP 1105 is much closer to CDP 1101 from the original digital representation than is CDP 1103.

The average luminance of a CDP in an analog form has typically some variation, due to different lighting conditions in the scanner and/or different amount of ink injected into the paper. This variability occurs naturally and cannot be controlled. To minimize the effect of this variability, one can determine an average luminance for the CDP from the original digital representation, determine the actual luminance of the scanned CDP, and then add or subtract a fixed value to each pixel in the scanned CDP, such that its average luminance becomes equal to the average luminance of the CDP from the original digital representation. For example if the average value of the pixels in the CDP from the original digital representation is 127 and the average value of pixel luminance in the scanned CDP is in fact 118, then 9 is added to each pixel in the scanned CDP. This adjustment of pixel luminance is typically applied before the histogram conversion.

After this transformation is applied, the pixel values of the CDP from the analog form will have the same spectrum as the pixel values of the CDP from the original digital representation. They are therefore comparable, and equation 1 can be applied. if $f( )$ is the histogram conversion function, the distance D is given by:

$$D = \text{Sum}\_j\ \text{Sum}\_i |x(I,j) - f(y(I,j))|^p/(N*M)$$

Note: this distance function is just one example; several other distance functions might be used.

For example, the transformation can be applied to the digital representation instead of the analog representation, i.e.:

$$D2 = \text{Sum}\_j\ \text{Sum}\_i |g(x(I,j)) - y(I,j)|^p/(N*M)$$

Dealing with Variations in the Printing-Scanning Environment

In certain applications, there will be a great many variations in the printing-scanning environments used to print analog copies. Among the reasons the variations can occur are the following:
  The analog forms containing the CDPs were printed on different printers;
  The analog forms were printed on different papers or substrates or different strata were overlaid on the CDPs.
  different scanners were used to scan the analog forms.
  different physical treatment of the analog forms.

An example of an application which produces such variations in the CDPs of different analog forms is postage meters that print CDPs on different types of envelopes made of paper with different properties and that sometimes even print the CDPs on different printers.

In such applications, the histogram conversion function may be affected by each combination of the properties mentioned above. Applying the wrong histogram conversion function would result generally in a distortion of the distance between the CDP from the analog form and the CDP from the original digital representation. One solution would then be to use several histogram conversion functions, and when verifying a CDP from an analog form, applying each of the histogram conversion functions to the CDP, finding the CDP from the analog form as modified by the histogram conversion function which has the lowest distance to the CDP from the original digital representation, and comparing only this modified CDP to the CDP from the original digital representation. If other parameters are dependent on the specific printer-paper-scanner combination (e.g. the threshold), then the selection of the "best" histogram conversion function would imply the selection of the other parameters.

The impact of an unstable printing-scanning environment can be minimized in other ways as well. Considering the set of possible histogram conversion functions for one application, where one conversion function can be generated for each CDP from an analog form, there are different ways to integrate the natural variation. One solution consists in measuring the standard deviation for each pixel, and then use it as a normalizing factor considered when measuring a distance between the CDP from the analog form and the CDP from the original digital representation. Another one consists in estimating an upper and lower bound for the typical value of each pixel luminance (e.g. luminance 100 should have a typical value between 90 and 110 in the scanned image, while luminance 40 could have a typical value between 20 and 60, which is twice as large) and penalizing the pixels that are outside those bounds more severely. Yet another solution would consist in having a set of different conversion functions that faithfully represent the spectrum of different conversion functions that can occur in the application, and using the most adequate one, resulting in the smallest distance between the CDP from the analog form and the CDP from the original digital representation, each time.

Even more conservative solutions are possible. One is to not use pre-estimated parameters, but to estimate them on the CDP from the analog form. This allows for more tolerance to variations but there are two potential limitations to this approach:
  Because parameters are estimated on the CDP from the analog form, this allows more tolerance of analog forms which do not respect the typical histogram(s) of the CDP from the original digital representation and which therefore may be non-original analog forms.
  As parameters are estimated from only one CDP from an analog form one can expect a less precise estimation of the parameters. For example, for a 10000 pixels CDP with 255 equally probable luminance values, there would be on average less than 40 samples per luminance value, and by natural statistical variation some luminance values would have significantly less than 40 samples.

The first problem can be treated in different ways. One is to have a pre-estimated conversion function, as in the standard approach, but to use it not to convert the CDP from the analog form, but only to measure a distance to the conversion function estimated for the CDP analog form. One possible measures of distance between conversion functions are:

$$D(f',f) = 1/256 * \text{Sum}(\text{lum}=0 \text{ to lum}=255) abs(f'(\text{lum}) - f(\text{lum}))$$

Where f'(·) and f(·) are respectively the self-estimated conversion function and the average conversion function. It is also possible to enter a normalization factor g(lum) corresponding to the natural variation for each pixel, e.g.:

$$Dn(f',f) = 1/256 * \text{Sum}(\text{lum}=0 \text{ to lum}=255) abs(f'(\text{lum}) - f(\text{lum}))/g(\text{lum})$$

This distance can be used as additional evidence that can enter in the decision. For example, two different CDPs from analog forms might have the same degree of similarity of 78 when their distance to the CDP from the original digital representation with the self-estimated parameter conversion. However, their self-estimated conversion functions might have a different distance to the average conversion function, e.g. Dn(f',f)=2.5 for the first CDP and D(f',f)=0.5 for the second CDP. The higher distance for the first CDP might be used to determine that it is a non-original analog form (despite its high quality), while for the same quality index the second CDP would be considered an original analog form.

The second problem can be dealt with by assuming a model for the conversion function, for example, the conversion function follows a certain regression function, e.g. a polynomial regression function or a logistic regression function. This minimizes the number of parameters to be estimated, and gives smoother functions with no discontinuity.

Finally, in some cases the printing-scanning properties can evolve over time and/or it is not feasible to calibrate the CDP detector initially. In those cases, a flexible approach consists in incorporating the data of each new scan, allowing more tolerance in the beginning when the parameters of the environment are not known, and progressively decreasing that tolerance as the addition of new data allows for a more precise estimation of the underlying parameters. This approach is general in nature, and is valid for all parameters relevant to the CDP detection (conversion function, threshold, etc.). To incorporate new knowledge, Bayesian learning can be applied where the importance assigned to the priors is progressively decreased. The information gained by evaluation can be stored in a database and shared between different verification stations. This approach allows for decoupling of the information regarding the CDP quality at the time of printing from the scanning parameters. The information is evaluated as the verification occurs, enabling a more flexible integration process for the solution A combination of the methods above is possible, in a scenario where several of the evaluation strategies are applied and the result is weighted to derive a probability for the resulting decision of concerning the quality of the CDP from the analog form.

Information about the print-scan environment and the properties that might affect the CDP quality (see above) can be stored in an encoded, machine readable way on the analog form. Alternatively it can be encoded in the CDP. In such a case, one way incorporating such information about the printer into CDP is to let the printer (e.g. a desktop printer) driver automatically add a code uniquely identifying the printer ("printer identifier") into the CDP being printed. On the scanning and verification side, the CDP detector reads the printer identifier and receives the information from the scanner (either obtained from the scanner itself, local or remote database, or inputted by the user). Then CDP detector can obtain calibration data corresponding to the print-scan environment from a database (either local or remote) based on the printer identifier and the information about scanner for decision making. Thus, it is possible to automate the calibration process for all types of printer and scanner.

Finally, in several cases, a correlation between the analog and digital representations can be made. In this way the step of transforming the analog or digital CDPs is completely bypassed. One possible correlation function is:

$$Dc = \text{Sum}\_j \text{Sum}\_i ((x(i,j) - \text{mean}\_x) * (y(i,j) - \text{mean}\_y))/\text{sqrt}(\text{var}\_x, \text{var}\_y)$$

Where:
mean_x is the average value of the x signal
mean_y is the average value of the y signal
var_x is the variance of the x signal
var_y is the variance of the y signal The techniques presented before can be applied separately to small portions of the VAP, and then grouped to output a "global score". For example, the VAP can be divided into small blocks (e.g. 10×10 pixels), and a measure of similarity or dissimilarity is applied to this block, to compute a "block score" for the block. Then the individual block scores can be pooled together to output in a variety of ways an overall score for the VAP. An obvious pooling would the simple average of all block scores, but other measures can be advantageous; for instance, block scores can be sorted out from the highest to the lowest value, and e.g. only the best 25% block score are used to compute an average that is the global score; or the global score is set as the block score at the $25^{th}$ percentile.

The advantage of selecting block scores that enter in the computation is that areas of the VAP that may have been more affected by the analog conversion can be excluded from the computation. Alterations to the VAP that one would like not to affect its score are: wear and tear, e.g. pen marking or paper folding; badly focused image capture affecting certain areas of the VAP. If these alterations were not excluded from computations of the global score—or if their impact was not minimized-, an original VAP could have a global score that is too low to be recognized as original.

The techniques discussed here also increase the robustness against less obvious or imperceptible alterations that regularly occur during printing and scanning.

Method of Using Information about the Print-Scan Process to Modify the CDP from the Original Digital Representation Prior to Comparison with the CDP from the Analog Form Typically, the CDP from the analog form is compared to the CDP from the original digital representation. The CDP from the original digital representation does not, however, take into account the effects of printing and scanning on the CDP from the analog form. These effects can typically be described as low-pass or band-pass filters applied to the CDP from the original digital representation. Comparing the CDP from the analog form to a CDP from the original digital representation that has been modified to simulate the printing and scanning effects may allow for a more precise measurement of the quality CDP from an analog form. For example, as a general observation, a pixel with a low luminance in the CDP from the original digital representation generally appears as a pixel that has a low luminance in the CDP from the analog form; however, the luminance of that pixel in the CDP from the analog form will generally be higher if it is surrounded by bright pixels in the CDP from the original digital representation than if it is surrounded by dark pixels. Modifying the CDP from the digital representation to simulate the print-scan process can take into account the impact of the neighborhood of a pixel in the CDP from the analog form on the pixel's luminance.

There are several ways to estimate the impact of the print-scan process. They can generally be classified into three categories:
1. The print-scan process can be simulated by looking at the average luminance value of each pixel in a large number of CDPs from analog forms.
2. The print-scan process can be estimated as a filter with a specific frequency response. The filter is then applied to the CDP from the digital representation, and the modified CDP from the digital representation is used in the detection process
3. The physical properties of the printer, the paper, and the scanner can sometimes be known, and can be used to estimate the pixel values of the CDP from the analog form. For example, thermal printers typically have a residual heat after printing each individual pixel or dot and this residual heat may have an impact on the following pixel, which may be printed with excessive heat, resulting in a darker than desired pixel. These physical effects, and many others pertaining to the specific printing and scanning device, and to the ink absorption properties of the paper, can be considered.

Obtaining Parameters for the Transformations Resulting from Printing and Scanning In the following, a number of different techniques are disclosed for obtaining the parameters required to compensate for the transformations that result from printing and scanning in the CDPs from the analog forms. These techniques fall generally into two different groups: technique for including the parameter information in the CDP itself or in the analog form and techniques for training the CDP detector.

Obtaining Parameters from the Analog Form Itself

Obtaining Parameters from the Analog Form's CDP

One place where the parameters needed to analyze the CDP from the analog form may be obtained is the CDP itself. As previously described, a CDP can carry a message, and the parameters may be included in the message carried in the CDP. For example, the quality threshold, over or under which a CDP from an analog form can be judged as being from an original analog form or a non-original analog form can be stored in the CDP, as can a specification of the histogram conversion function.

Universal Document Authentication (Authentic Always): Every Printer Prints a New CDP onto Each Analog Form Being Printed.

A CDP provided by the printer can be printed per default on each analog form being printed on the printer. If an analog form printed on the printer is made from an original digital representation with a CDP, the analog form will have two CDPs: one provided by the printer and one from the original digital representation. The CDP provided by the printer of course records the transformations resulting from printing the analog form on the printer and these transformations can be used to determine whether the analog form's CDP from the original digital representation indicates that the analog form is the result of a printing-scanning-printing process and therefore not an original analog form.

Information about the printing process can also be stored in a remote database, and the CDP or document may contain an identification that allows the detection device to access this information in the remote database.

CDPs and Other Security Features

A VAP can be printed on a document using an "invisible ink", that is, a thin, transparent coating that is normally invisible to human beings but has a readily detectable physical characteristic such as electrical conductivity, electrical impedance, electrical capacitance, or electroluminescence. Additionally, a VAP can be printed in specialty inks which have extensive use in the security document sector. These specialty inks include everything from using multiple colors, to the use of high intensity ultraviolet light to create a pattern fluorescing under visible or ultraviolet light.

A physical security feature, such as a fiber or inks, may carry a key for a CDP. The CDP can also be combined with security storage devices such as smart cards, 2D barcodes, magnetic card, etc. The secret key and calibration data which depends on the printer properties can be stored in those storage devices.

The CDP is also complementary with physical, chemical, or optical copy prevention features such as a "VOID" pantograph appearing on a non-original analog form.

Automatic Selection of Calibration Data

Like a printer or scanner driver, a CDP reader (verifier) can select appropriate calibration data manually or automatically. For example, when a CDP is printed, a code which uniquely identifies the printer, or the category (printer model) of the printer is embedded into the CDP, stored into a database or on the document where CDP is printed. At the verification stage, the reader first detects the code and then selects the appropriate calibration data for verification. The scanner-dependent parameters such as thresholds for verification can be automatically selected in a similar fashion.

Automated Calibration—Training Phase

To optimize the detection of a CDP for a specific application that is defined by fixed settings for the printer/scanner, various parameters of the scans of the printouts for that application need to be evaluated. For example, the histogram conversion function discussed above depends on the printer and scanner settings, and the quality or similarity threshold used by the detector to take a decision also depends on the scanner settings. However, as the print-scan process is intrinsically noisy and varies, within statistical boundaries, from print to print and from scan to scan, it is necessary to estimate statistically the values of the parameters. However, printing and scanning thirty or more CDPs in order to estimate the parameters is difficult, tedious, and error-prone. There are thus clear advantages to automating this process, required for setting up each application, in order to allow arbitrary people to create applications that detect copies using the CDP.

Figure 15:
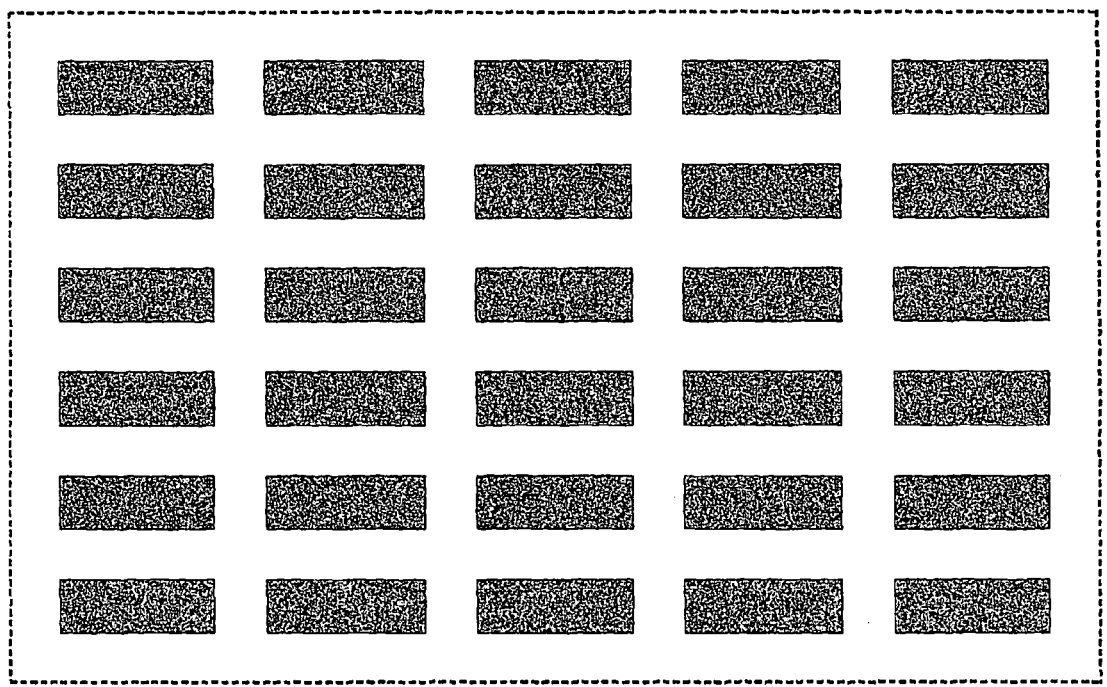
FIG. 15 is a calibration image of a CDP.

One way to automate the process of statistically estimating the parameters is to create a so-called calibration image, a digital image containing several copies of CDPs from analog forms made from the same digital representation or of a CDP with a particular key or payload where that variation is known. One such image 1501 is shown in FIG. 15. This image is then printed and scanned with the printer and scanner settings of the application. Then the printed calibration image is scanned and processed with the CDP calibration software. If the calibration is successful, the calibration software outputs the parameters of the application and the decision threshold of the detector. The decision threshold is typically computed by first measuring the average and variance of the quality index, then by fitting a statistical model to these data in order to determine a threshold that does not result in, for example, 1 error in 10000 cases (assuming the statistical distribution holds). The user can give as a parameter an upper bound on the probability of false alarm (detecting an original as a copy) which will be used in the computation to determine the threshold.

Iterative learning for each new detection can be incorporated into the detector. In one embodiment, the user can be asked to use the detector with five different original analog representations. Various useful statistics and parameters (for example, a decision threshold) of the original analog representation are computed. In operational mode, this decision threshold and the other parameters and statistics can be used for decision and iteratively adjusted.

Using the CDP from the Analog Form by Itself to Make a Rough Determination of Whether an Analog Form is an Original Analog Form In order to measure the quality difference between the analog form and original CDP, it is first necessary to restore the digital representation of CDP that is made by scanning the CDP from the analog form to a form which permits comparison of the digital representation of the CDP from the analog form with the original digital CDP. This process is usually costly and sometimes is very difficult due to the corruption of the analog form. In some cases, it might be desirable to make only a rough estimation of whether the analog form is an original or non-original analog form, or it is simply not possible to make a precise estimation, without the costly correlation (restoration and comparison) process. Reasons can be that computation costs are too high, the CDP has been corrupted, a key or other essential parameters are lacking, or detection software has not been made available for security reasons, etc. The rough estimation may be made by directly measuring global properties of the digital representation of the CDP that is made by scanning the CDP from the analog form: some of these global properties are the histogram distribution, the average luminance, the average degree of variation between two consecutive pixels, density and distribution of black and white pixels for a binary CDP, etc. Since these global properties are generally invariant in rotation, scale and translation, so there is no need to restore the digital representation of the CDP from the analog form in order to measuring such global properties. Thus, measurement of these properties requires neither the original digital CDP nor the key to generate it. A rough estimation is made by comparing the similarities between these global properties and certain predetermined properties of the CDP which depend upon the CDP's randomness and high entropy.

Though the degree of reliability in deciding whether an analog form is an original analog form or a non-original analog form will not be as high when the decision is only based on measuring these global properties, most non-original analog forms made using lower end digital imaging equipment can be detected. A detector that performs global checks on the CDP from the analog form can also be used to screen for suspect analog forms and subject them to further investigation using a detector that has access to the information necessary for to restore the CDP from the analog form.

Postage Meter Applications as an Example of the Foregoing Techniques

A CDP can be automatically inserted into the digital image of the postal indicia. The image is then typically printed on a sticker glued to the envelope or directly printed on the envelope. The CDP from the postal indicia can later be used to automatically detect if the postal indicia are an original analog form or a non-original analog form. The quality index measured using the CDP from the indicia can be combined with other features of the postal indicia, for example, determining the printer that produced the indicia, analyzing the font of the letter, and/or reading a printed digital watermark, into a global score that is used to automatically or manually determine if the indicia are an original analog form The CDP on the printed indicia can be used for forensic verification, such as when a suspicious postal indicia is brought to a station equipped with a flatbed scanner and the detection software. It can also be used for automatic verification when a high-speed scanner (e.g. a WFOV) makes an image capture of each postal indicia.

In such an application, the key for the CDP can be fixed or variable. If it is variable, the key can be (partly) derived from other information contained in the postal indicia, e.g. the sender name.

Technique for Inserting Information into a VAP

As already described, a VAP may carry a message. The message is incorporated into the VAP when the VAP is created. Because the VAP is created with the message, each different message results in the generation of a different VAP. One way of incorporating the message into the VAP is to use a secret key and the message as inputs into the pseudo-random number generator that is used to generate the VAP. It is generally desirable to incorporate the message into the VAP in a manner which preserves the histogram, or entropy, of the VAP. All of the schemes described below for incorporating the message into the VAP have a histogram and entropy similar to a VAP that would not contain information. But even though preserving the histogram or entropy of the VAP can have some advantages, for instance the VAP's ability to discern copies from originals should not be affected, preserving the entropy or histogram is not a requirement. In other words, it is still possible to create VAPs containing information and use them to discern copies from originals without preserving their entropy or histogram.

In one embodiment, the VAP is divided into different non-overlapping areas, for example into adjacent blocks of fixed size. This size is arbitrary, for example 1×1 pixel, 4×4 pixels or 8×4 pixels will all work. If the block size is too large, the size of the message will be limited; if it is too small, the message may be hard to read. For example, if each block carries a single bit, either a '1' or a '0', of the message, each pixel in the VAP belongs either to the category of pixels that hold a '1' or to the category of pixels that hold a '0'. The category "c" to which a pixel belongs, its position "p", and the secret key "key" used in the pseudo-random number generator, are used in function G to produce the pixel value x, i.e:

$$x=G(\text{key},p,c)$$

For a binary pixel value, x is either 0 and 1, and for a grayscale pixel value, x is an integer between 0 and 255. All values of x are equally probable.

It is possible to decompose function G in two functions G1 and H, where G1 is a pseudo-random number generator that takes as input the key and the pixel position, and H is a function that adjust the pixel value depending on the category to which it belongs:

$$x=H(G1(\text{key},p),c)$$

In one possible implementation, H is such that when the block carries a bit '0' (or in other words its category c is '0'), H leaves the pixel value unchanged:

$$H(G1(\text{key},p),'0')=G1(\text{key},p).$$

But when the block carries a '1', H "inverts" the value of the pixel, i.e.

$$H(G1(\text{key},p),'1')=1-G1(\text{key},p)$$

if the pixel is binary, and $$H(G1(\text{key},p),'1')=255-G1(\text{key},p)$$

if the pixel value is grayscale.

Another way of describing how a block can carry an element of a message is that one bit can be carried in one block by defining two categories of blocks: B1 and B0. B1 is the category of blocks that carries a bit '1' and B0 is the other category of blocks that carries a bit '0'. B1 and B0 are preferably defined in such a way that any block (b1) in B1 has minimum correlation with any block (b0) in B0. One simple way to create pixel values for b0 or b1 is to take the bit value as a seed in addition to the key and the pixel position for a random number generator. To reduce the potential "overlapping" between b0 and b1, especially for a block with small number of pixels, the random number generator can be controlled in such a way that the values for b0 is very different from the values for b1. To read the bit value during detection, the blocks from analog form are compared to b1 and b0. If the correlation with b1 is better than with b0, the bit value '1' is read. Otherwise the bit value '0' is read.

Many methods are possible to compare the blocks from analog form to b0 and b1; but in general, a correlation or a distance measure will provide satisfactory results. Even more generally, the block may encode any of N values if the number of block categories is increased from 2 to N. Let us note that with N block categories, a block can contain up to log 2(N) bits. For example, if N=4, a block with a "1" value may encode a value between 0 and 3, depending on which of the four categories the block belongs to, therefore containing 2 bits. To make the technique work with N values, minimum correlation is required in a category between a block of the category that represents a value and a block of the category and a block that does not represent a value. Also, the definition of "block" can be extended to represent anything from 1×1 pixel, to an arbitrarily disconnected set of pixels.

FIG. 17 shows the transformation of a set of pixels with a message inserted. A block with pixel values that have not been modified is shown at 1701. At 1702 is the block of pixels shown at 1701 after the block has been modified to carry a bit having value '1'.

It can be easily verified that the histogram or frequency distribution of pixel values of a VAP with information inserted in the above fashion remains unchanged. FIG. 12 shows a VAP generated with the key "test" at 1201, a VAP generated with the same key with added information (integer value 123456789) at 1203, and a difference image at 1205. The black areas (actually blocks of 4×4 pixels) of the difference image correspond to the pixel values which have not been modified (inverted) by the insertion of information: they correspond to blocks where a '0' is embedded. Obviously, the noiselike, modified areas correspond to area where a '1' is embedded.

One possible way to perform detection consists, in a first step, in generating the digital VAP that contains no information. Then each block of the scanned, restored and histogram converted VAP is compared with (1) the corresponding block of the original digital VAP, and (2) the same block with inverted pixel values. Different comparison functions can be used: the Euclidean distance, the absolute distance, etc. Then if the closest block is the inverted one, then the bit value of the block is assumed to be '1', and '0' otherwise.

For example, 1703 in FIG. 17 is shown a block of pixels that have been scanned from the analog form, restored, and converted. When this block is compared with the corresponding block from the original digital representation's VAP and the same block with inverted pixel values, the absolute differences are:

For a '0': (|243−44|+|228−36|+ . . . +|104−172|)/16=132.81

For a '1': (|12−44|+|27−26|+ . . . |151−172|)/16=22.93

In this case the detected bit is a '1'.

If a bit is embedded several times at different places in the VAP, it is possible to keep track of the distances for a '0' and a '1' at each location, such that the contribution of each block to the final decision on the bit value is weighted. This way, a block where a distance of 55.32 is found for a '0' and 51.34 for a '1' would contribute less than the bock whose computations are shown above, where the evidence in favor of a '1' is much stronger (distance of 22.93 vs. 132.81).

Since the presence of the message affects the appearance of the VAP, a scanned VAP that contains a message cannot be compared with the VAP from the original digital representation to determine if the scanned VAP came from an original analog copy or a non-original analog copy until the effects of the incorporation of the message on the VAP have been taken into account. This can be done once the message is known by recreating the VAP from the original digital representation with the message and then comparing the recreated VAP with the message with the scanned VAP with the message. In some cases, the message cannot be read, for example because the quality of the printing is too low. One would still like to determine if the VAP is a damaged original, or a copy, or even a pattern that looks like a VAP but was generated differently, for example by using a different key. To permit this determination, one can reserve a part of the VAP whose blocks do not contain elements of the message. The portion of the block may be determined for a given secret key and the portion can be used to make the determination even if the message cannot be read.

The individual bit values detected in each block may be used to encode a particular message in a robust and secure manner. For example, to embed a message consisting of the identification number "123456789" in a VAP, one may use the following procedure:

Represent the message in 4 bytes, or 32 bits, which allows for representation of any of 2^32 integer values.

Add an error correction/detection code to the 32-bit message; if a (8,28) BCH code is used, the message with error correction coded is represented on 28×4=112 bits Count the number of available blocks in the VAP; for a 100×100 pixels image divided in 4 blocks, this amounts to 625 blocks. Each of the 112 bits can be inserted at 5 locations in the VAP (625−112*5=65 left blocks can be left unused, or used to embed some bits a $6^{th}$ time).

Using a secret key, scramble the 112-bitstream and insert it in pseudo-randomly selected blocks of the VAP, using one of the schemes described above to insert the bit 1 or 0.

To detect the message from an analog representation of the VAP, the steps can be generally followed in reversed order. Note that the steps are the same for a non-original VAP.

determine what should be the values of the VAP in each block if a 0 and if a 1 was embedded;

for each block in the analog VAP, measure two scores, one corresponding to how likely the block contains a '1', and the other corresponding to how likely it contains a '0';

as each bit of the message is represented generally several times (in this case the 112-bit is represented 5 times), accumulate the individual scores from the different locations at which the bit was embedded (these locations can be known with the secret key). Select the most likely bit based on the ac cumulated scores.

apply error correction to 112-bits to get the 32-bit message convert the 32-bit message as an integer number, in this case "123456789".

Distributed VAPs

Figure 14:
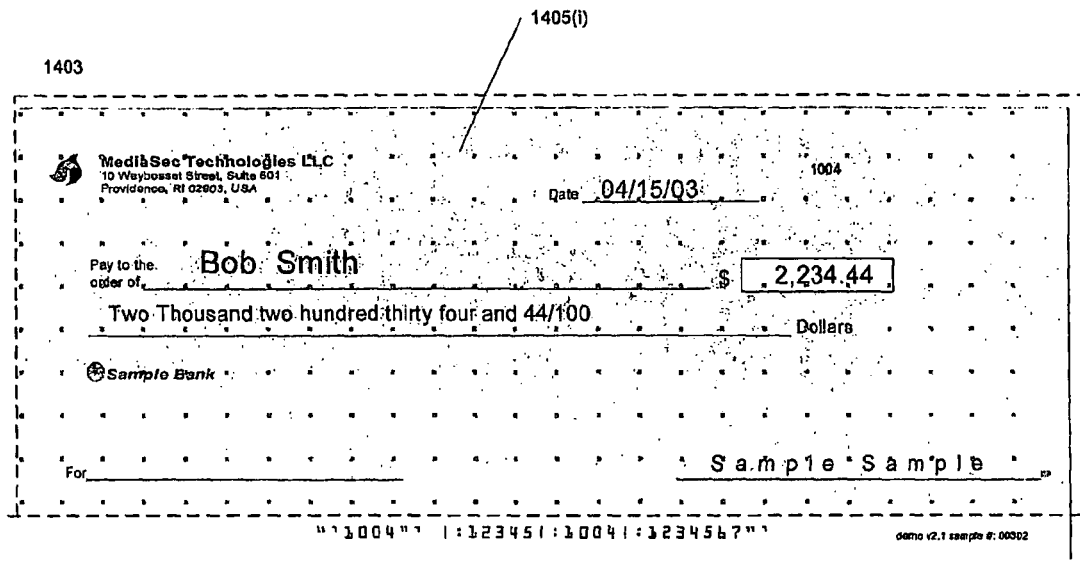
FIG. 14 is a check with a distributed CDP.

For certain documents, the visual aspect of the VAP can be incompatible with the requirements of aesthetics. For example, the aesthetic aspect of a banknote is very important, and in general the security features of these documents must either be unnoticeable, or not disturbing, or naturally fit into the design of the document. One way of applying VAPs to such documents is to distribute them across the document. FIG. 14 shows a check 1401 with a distributed VAP 1403. The distributed VAP is made up of a number of VAP units 1405. In check 1401, each VAP unit 1405(*i*) has a size of 10×10 pixels and the VAP units 1405 are regularly distributed every 100 pixels in distributed VAP 1403. Taken together, the pixels in the VAP units 1405 are equivalent to a non-distributed VAP having a size of 240×100 pixels. The VAP units of check 1401 are very obvious, but they can be made much less so by using more textured VAP units, by using smaller VAP units, and/or by randomizing the locations of the VAP units. When a VAP unit is created, the unit's pixels may be given a range of values which blends in with the background provided by the document at the unit's location in the document. The density of the VAP units in a given area of the document may also be adjusted to render the VAP units less perceptible. A secret key may be used to determine the locations of the VAP units.

A Distributed VAP Having Pixel- or Dot-Size VAP Units

A distributed VAP may be made up of pixel- or dot-sized VAP units. In such a distributed VAP, the pixel- or dot-sized VAP units (both termed in the following dots) are spread across the analog form, and each dot has a random pixel luminance value. The dots can be distributed in a regular pattern or can have a random or pseudo-random distribution. The distribution may be determined using a secret key. As is the case with other VAPs, the dots are printed when the analog form is printed. FIG. 16 shows an example of an analog form 1601 with a random distribution of dots 1602. The pattern of pseudo-random dots and dot values can be of a fixed size, e.g. 2×2 inches, and the pattern can be tiled over the entire analog form.

At detection time, a dot detection algorithm can be applied to detect all or most of the dots in a digitized image of the analog form. Techniques for locating dots are described in U.S. Pat. No. 6,782,2116, Zhao, et al., Apparatus and methods for improving detection of watermarks in content that has undergone a lossy transformation, issued Aug. 24, 2004 and incorporated herein by reference for all purposes. Once a set of dots is detected, a search algorithm is applied to find groups of dots with specific properties. One such property may be a relationship between the values of the dot's pixels and the background provided by the document at the dot's location. Once a group of such dots has been found, the registration of the dot patterns is known, the pattern of dots from the analog form can be compared with a pattern of dots from the original digital representation, and a quality index can be determined for the analog form.

Distributing a Distributed VAP Through Areas that Contain Text and Graphics

The pixels of a distributed VAP can be made less noticeable by distributing them through areas that contain text or graphics, as shown at 1603 in FIG. 16. Such a VAP may be processed as described generally for distributed VAPs. The units of the distributed VAP can also form a specific visual pattern such as a visible watermark in a document.

Distributing a Distributed VAP Through Areas that Contain Other Security Features The pixels of a distributed VAP can be used to form a security feature such as a pantograph, kinegram, holograms, or a microtext (microprinting).

Printing VAPs with Non-Grayscale Printers

Certain type of printers can only print purely black pixels, and do not have the ability to print grayscale VAPs having any possible pixel luminance value between 0 and 255. For these kind of printers, the pseudo-random number generator that is used to generate the VAP pixel values can be set such that a pixel value is either '0' (black), or '1' (white). The algorithms discussed above can all be applied to binary VAPs.

It should be remarked that certain printers like inkjet or laser printers actually produce a range of gray tones by employing digital half-toning methods, i.e. by printing tiny binary (black?) dots at a high resolution (e.g. 1200 dpi) for a grayscale image of a lower resolution (e.g. 300 ppi). For those printers, a binary representation of the image is produced by the printer from the input grayscale representation, and in the end it is a binary black and white image that is printed. Instead of generating and printing a grayscale VAP, which has to go through the transformation by the printer, it is possible to produce a higher resolution (e.g. 1200 dpi) binary VAP which is printed as is by the printer (without digital half-toning process).

To reduce potential interference between black pixels at a higher printing resolution (mainly caused by the melting of ink or absorption of the ink by paper), it is possible to control the ratio of black to white in creating a VAP. The ratio should be around 1.0 for a normal binary VAP in which the numbers of black and white pixels are almost equal. A reduced ratio leads to a VAP with fewer black pixels. For the reasons given above, this may be more appropriate for some applications.

For printing a binary VAP it is important to use an appropriate printing resolution, i.e. pixel per inch (PPI). If PPI is set to too high, either the printer and/or print media (i.e. paper) may not be able to provide such resolution so that the quality for original analog form may be lower than expected. On the other hand, if the PPI is set to too low, each pixel printed on the analog form may be easily picked up by a scanner so that the quality degradation may be too small for discerning copies from the original. Appropriate PPI is selected to print a CDP in best quality. Therefore the PPI will often depend on the resolution of printer and the quality of the print media used for a specific application.

Finally, there are other binary printing processes that could print binary VAPs: e.g. laser engraving of metal, glass plastic or other material, certain holograms, etc.

Using VAPs for Visual Encryption

One interesting property of VAPs is that, in addition to their use for automatically discerning copies from originals, they can be used for manual authentication in a process called visual encryption, first described in Moni Naor and Adi Shamir, Visual Cryptography, Eurocrypt 94. We describe below one possible way to enable visual encryption with binary VAPs.

To enable visual encryption with VAPs, VAPs are created and printed the same way as they are usually. Let us call the printed VAP VAP0. Then, one needs to decide which visual message (or image) one would like to see in legitimate VAPs. In general, visual messages are digital black/white images, the same pixel size as the digital VAP (the visual message can always be adjusted to match the size of the digital VAP). Let us call this visual message VM. Then, he creates a new VAP called VAPk, of the same pixel size as VAP0 and VM, such that, for each pixel (x,y):

$VAPk(x,y)=1-VAP0(x,y)$ if $VM(x,y)=0$ $VAPk(x,y)=VAP0(x,y)$ if $VM(x,y)=1$

VAPk, is the visual key: if it is printed on a transparency (pixels with value '1' will let the light go through), it will reveal the message when it is placed precisely over the printed VAP. Indeed, in that case the luminance value perceived by the observer, which we will call I(x,y), will be the darkest of the printed VAP and the VAP manual key:

$I(x,y)=\min(VAP(x,y),VAPk(x,y))$

It can easily be verified that I(x,y) will always be 0 in black areas of the message (where VM(x,y)=0), while in white areas of the message, I(x,y) will have the same value as the printed VAP(x,y). For a binary VAP with values of 0 and 1 that are equiprobable, that means that in white areas of the message, 50% of the pixel of I(x,y) will have a bright value.

Overall, the visual message will appear to the observer in a somewhat less contrasted way than its original version, but will still be discernable.

FIG. 18 shows a binary VAP0 1801, the visual message "1234", 1805, the visual key VAPk 1803 created from the binary VAP and the visual message. Finally, the manner in which the visual message is revealed when VAPk 1803 is overlaid onto VAP0 1801.

General Principles

The work which has led to the above improvements in VAPs has also elucidated a number of general principles concerning copy detection which are embodied in VAPs. One general principle embodied in a VAP is that artifacts produced by the copying process may be used to determine how many times a digital representation has been through a copying process. One example of this principle is the use of artifacts produced by the printing and scanning involved in making non-original analog forms to detect whether an analog form is non-original. As will be explained in more detail below, another example of the principle is the use of a portion of a digital representation that does not have error correction to determine how many times the entire digital representation has been through the copying process. Essential to both examples is that there be copying for which error correction is disabled. In the case where the concern is copying involving transformations between digital and analog forms, digital error correction can have no effect in the analog realm; in the case of digital to digital copying, provision must be made to disable digital error correction in a part of the digital representation.

Another general principle embodied in the VAP is that the area which is being used for copy detection have a random pattern with high entropy. The pattern is made up of pattern elements, which may take any form, but are generally primitive elements of the digital representation containing the VAP. For example, if the digital representation is an image, the pattern elements may be pixels, and if it is a video, the pattern elements may be the blocks used to represent the video image. The pattern is typically produced using a secret key. The randomness and entropy of the pattern makes it difficult to see the artifacts produced by the copying and thus to modify the pattern to hide the artifacts produced by the copying process. The properties of the random pattern are carefully selected to take the characteristics of the artifacts produced by the copying process into account. In the case of the VAP, for example, the properties that are selected on the one hand survive the copying process but on the other hand are recognizably affected by it.

Authentication Patterns for Copying Involving Transformations Between Digital and Analog Realms Such authentication patterns will be termed analog-digital authentication patterns in the following.

General Principles of Analog-Digital Authentication Patterns.

Analog-digital authentication patterns are based on the following two principles:

1) A non-original analog form always goes through an analog output-digital recording of the analog output process, while an original analog form is only output. This results in a detectable difference of quality between an original analog form and a non-original analog form 2) The analog-digital authentication pattern (ADAP) is a key-generated graphic that is designed to be maximally sensitive to transformations resulting from conversions between the analog and digital realms and to show those transformations in a fashion such that an automatic detector working on a digitized representation of an ADAP from an analog form can measure an index of quality degradation of the ADAP and thereby determine whether the analog form is an original or non-original analog form.

It can be easily seen that these two principles can be applied to any analog form produced from an original digital representation. In all cases, an analog form is made from a digital representation. Any such analog form can potentially contain a pseudo-random noisy signal which is the functional equivalent of a VAP in an image. An ADAP is thus the equivalent of a VAP in a different analog form. Similarly, the equivalent of a CDP would be known as a Copy Detection Signal (CDS).

As with the VAP, what is required for an ADAP is that the ADAP be distinguishable from the other content of the analog form. For example, with radio signals, certain frequency bands could carry the ADAP. With media such as magnetic or optical tapes, disks, or stripes, a predetermined area of the tape, disk, or stripe could contain the VAP, and with multimedia analog forms, the ADAP could be contained in a track of the multi-media analog form.

Example Applications of ADAPs

Using a CDS to Detect Counterfeit RFID Signals

Radio Frequency Identification Devices (RFID) are attached to individual, arbitrary items, and emit a unique signal that serves as a unique identification of the item. Though the technology is just at its beginning and the cost of RFIDs is still high, various applications of this technology are expected to appear, in particular in the areas of retailing, distribution and storage.

For counterfeiters, the widespread use of RFIDs could mean that counterfeited items must have counterfeited RFIDs, which emit a counterfeited signal. Counterfeiting a RFID signal would be done by capturing an original RFID signal and creating a RFID device that reproduces that captured RFID signal.

The similarity with the situations in which VAPs are used detect non-original analog forms is striking: assuming the RFID signal to be counterfeited is captured by making a digitized representation of its original analog form and the digitized representation is used to produce the counterfeit (non-original) analog form, then the original analog form of the RFID signal undergoes one analog-to-digital transformation before it is analyzed for authenticity; the non-original analog form has undergone two analog-to-digital transformations, one during the process of producing the counterfeit analog form and another before it is analyzed for authenticity. The additional analog-digital conversion will generally result in an additional loss of quality or information of the RFID signal. It is therefore possible to create a Copy Detection Signal (CDS) that is maximally sensitive to the transformations resulting from the digital-analog conversions, and that would be emitted by the RFID. This signal would be analyzed the RFID detector to detect if the RFID device authentic or counterfeited in much the same way that a VAP is analyzed.

Using the ADAP to Determine in General how Many Digital to Analog and Analog to Digital Conversions a Signal has Undergone Each time a signal undergoes an A/D or D/A conversion, the conversion device will introduce "noise". Generally the noise thus introduced has specific patterns of "noise". By including an ADAP in the signal to measure the noise introduced by the conversion and analyzing the characteristics of the "noise" and comparing the ADAP with the original ADAP one can determine whether to treat the analog form or digital representation containing the ADAP as a pirated copy and can perhaps also determine something about the mechanism by which the pirated copy was made. Furthermore, it may also be possible to figure out the generation of the copy by measuring the quality degradation.

Using a CDS to Plug the "Analog Hole" for Copy Prevention of Digital Representation The "analog hole" refers to a fundamental vulnerability in copy prevention schemes for digital content which is intended to be played back using analog means. When the information is converted to analog form, all digital copy protection mechanisms such as digital right management (DRM) information get lost and there are no restrictions on the resulting analog signal, and the content can be captured back into digital form with no restrictions. By adding a CDS to digital representation to be protected, a device (such as a DVD player or a DVD recorder) may contain a CDS detector which automatically reads the quality of the CDS and permits or rejects the operation if the CDS detector indicates that the digital representation is an original digital representation or a non-original digital representation. The CDS can be placed in a number of places in various ways. For example, it can be inserted visibly as a "Copyright Warning" frame in the beginning of a movie or subtly placed at specific locations of a movie as a distributed PAP. This principle can also be used to detect movie copies that is captured with a camcorder in a movie theater and converted and compressed to a digital file, because the camcorder recording is also considered as a "copy" process. When one attempt to play or copy the camcorder-pirated movie, the device which include a CDS detector may stop playing or copying. Furthermore, if all camcorder is equipped with a CDS inserter, such CDS inserter automatically inserts CDS in certain frames and at the same time such CDS carries message uniquely identifying the camcorder (such as a camcorder ID) during recording. Thus, from camcorder-pirated movie, CDS detector not only detects it is a copy, but also identify the source of the piracy.

Using an Authentication Pattern to Enforce a "Copy Once" Provision on a Digital Medium When an original information is recorded in digital form to a storage media such as computer hard disk, a digital tape, a compact disc or a DVD disc, additional disc-level error correction code (such as Reed Solomon code) is typically added to correct the errors potentially introduced by recording or reading devices or physical damages (such as scratches on CD or DVD) on the storage media. Because of the disc-level error correction, the digital representation can be read from the storage media which is identical to the original information after correcting the errors above. So can an identical copy to the original information be made from the storage media. However, without such disc-level error correction, a copy made from the storage media in which the original information is stored suffers from "degradation" because of the errors introduced in recording, reading and media itself. Because even digital-to-digital copying results in degradation of the copy with regard to the original, a CDS can be used to enforce a "copy once" provision which permits the user to make a single digital copy. The CDS can be generated in pseudo-random way, using a key, which makes its content unpredictable. To ensure that the CDS will be degraded by the copying process, it contains no error correction scheme. For example, it can be inserted to the "User Data" section of a Compact Disc or DVD, inserted/distributed to "User Data" fields of video or audio compression format (such as MPEG-2 or H.264), or inserted/distributed as part of original information (such as a frame of video in the beginning of a movie). The CDS will be reproduced, in a degraded way when a copy of an original digital representation is made. If a copy of a copy is made, the CDS will be degraded twice, and be of lower quality. Given this quality of the CDS, a device may be constructed which automatically reads the quality of the CDS and permits the user to make the copy only if the CDS indicates that the digital representation is an original digital representation not itself a non-original digital representation. One area of use for such a copy detection signal would be in a copy detector on a copying device that permitted only DVDs that were original digital representations to be copied.

CONCLUSION

The foregoing Detailed Description has disclosed to those skilled in the relevant technologies the inventors' techniques for using copy detection signals generally to determine whether a digital representation is an original or a copy, for determining whether an analog form of an object is an original analog form or a non-original analog form, their improved techniques for locating and analyzing VAPs, and their new techniques for including messages in VAPs and has further disclosed to those skilled in the relevant technologies the best modes presently known to the inventors for practicing the techniques. It will be immediately apparent to those skilled in the relevant technologies that many embodiments of Applicants' techniques other than those disclosed herein are possible. The basic technique of the copy detection pattern can be used with any digital medium and the pattern elements, size, shape, location, and pattern of a copy detection pattern will be determined by the nature of the medium the copy detection pattern is being used with and by the copy detection pattern's purpose, as will the techniques used to analyze the copy detection signal. How a VAP or CDS carries additional information, what that information is, and how it is used in the analysis process will also be determined by the nature of the medium to which the CDS is being applied and by the purpose of the application. In general, CDS's may be used in any situation in which changes resulting from a copying process are to be detected.

For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. A digital representation of an analog signal, the digital representation being characterized in that:
   the digital representation includes a representation of a copy detection signal whose sensitivity to transformations produced by digital-to-analog and analog-to-digital conversions is not based on a watermark contained in the copy detection signal,
   the representation of the copy detection signal being comparable with the copy detection signal of another digital representation to determine a copying relationship of the analog signal to the other digital representation of the analog signal.

2. A method of creating a digital authentication pattern that permits non-watermark-based determination of a copying relationship of a digital representation of an object with which the digital authentication pattern is associated, the digital authentication pattern containing a message, the digital authentication pattern belonging to a digital representation of an object with which the digital authentication pattern is associated, and the digital authentication pattern including a plurality of pattern elements that have pattern element values and the method comprising:

selecting a set of the pattern elements to represent message elements of the message; and for a pattern element belonging to the selected set of pattern elements, setting the pattern element's pattern element value to represent the message element such that setting the pattern element's value to represent the message element leaves the digital authentication pattern's usefulness in determining the copying relationship substantially unchanged.

3. The method according to claim 2, wherein:

in the step of setting the pattern element value, the pattern element value is set such that the entropy of the digital authentication pattern is substantially unchanged.

4. The method according to claim 2, wherein:

in the step of setting the pattern element value, the message element specifies a message element value belonging to a range thereof; and the pattern element value of the pattern element belonging to the selected set of pattern elements is set to one of the values of the range.

5. The method according to claim 4 wherein:

in the step of setting the pattern element value, the selected set is set using a key.

6. The method according to claim 4 wherein:

in the step of setting the pattern element value, the pattern element value of the pattern element belonging to the selected set of pattern elements belongs to one of at least two categories of pattern element values, the category of the pattern element value represents the message element, and the pattern element is given a category as required for the message element value of the message element represented by the pattern element.

7. The method according to claim 6 wherein:

the pattern element values in the selected set belong to two categories.

8. The method according to claim 7, wherein:

in the step of setting the pattern element value, the values of the pattern element in the selected set is inverted in magnitude to indicate a category.

9. The method according to claim 2, wherein:

in the step of setting the pattern element value, the message is encoded using a key.

10. The method according to claim 2, wherein:

in the step of setting the pattern element value, a key is used to select the set of pattern elements that represent message values.

11. The method according to claim 2 wherein:

the pattern element is a primitive element of the digital representation to which the digital authentication pattern belongs.

12. A storage device that is characterized in that:

the storage device contains code which, when executed by a processor, implements the method according to claim 2.

13. A digital authentication pattern that permits non-watermark-based determination of a copying relationship of a digital representation of an object with which the digital authentication pattern is associated, the digital authentication pattern containing a message and the digital authentication pattern comprising:

a plurality of pattern elements, the plurality of pattern elements including a set of the pattern elements that represent message elements of the message; and in a pattern element that represents a message element, the value of the pattern element is set such that setting the value of the pattern element to represent the message element leaves the digital authentication pattern's usefulness in determining the copying relationship substantially unchanged.

14. The digital authentication pattern according to claim 13, wherein:

the pattern element's value is set such that an entropy of the digital authentication pattern is substantially unchanged from a digital authentication pattern that does not contain a message.

15. The digital authentication pattern according to claim 13, wherein:

the message elements specifies a values belonging to a range thereof; and a pattern element that represents the message element set to one of the values of the range.

16. The digital authentication pattern according to claim 15 wherein:

the pattern element values belong to categories thereof;

the category of a pattern element value represents the value of the message element represented thereby.

17. The digital authentication pattern according to claim 13, wherein:

the pattern element is a primitive element of the digital representation to which the digital authentication pattern belongs.

18. The digital authentication pattern according to claim 17, wherein:

the pattern element is a pixel.

19. The digital authentication pattern according to claim 17, wherein:

the digital representation is a representation of an audio signal and the pattern element is a primitive of the representation of the audio signal.

20. The digital authentication pattern according to claim 17, wherein:

the digital representation is a representation of a video signal and the pattern element is a primitive of the representation of the video signal.

21. A storage device which is characterized in that:

the storage device contains the digital authentication pattern according to claim 13.

22. A method of reading a message contained in a digital authentication pattern, the digital authentication pattern permitting non-watermark-based determination of a copying relationship of a digital representation of an object with which the digital authentication pattern is associated, the digital authentication pattern including a plurality of pattern elements having pattern element values, the pattern elements including a set of pattern elements that have pattern element values representing message elements of the message, the values of the set of pattern elements having been set to represent the message elements such that the digital authentication pattern's usefulness in determining the copying relationship remains substantially unchanged, and the method comprising:

selecting the set of the pattern elements whose pattern element values represent message elements of the message; and for each pattern element belonging to the selected set, comparing the pattern element with equivalent pattern elements that have a possible message element value to determine the message element values of the message elements in the selected set.

23. The method according to claim 22 further comprising:
after the message has been read, creating an equivalent digital authentication pattern to the digital authentication pattern that contains the message, whereby the digital authentication pattern that contains the message is comparable with the equivalent digital authentication pattern to determine the copying relationship with regard to a digital representation that contains the digital authentication pattern that contains the message.

24. The method according to claim 23 wherein:
in the step of creating, the equivalent digital authentication pattern is created by replacing of pattern elements in the equivalent digital authentication pattern that belong to the selected set with equivalent sets of pattern elements that represent the message elements.

25. The method according to claim 22, wherein:
the message element value belong to a range thereof; and the equivalent pattern elements include a pattern element for each of the values in the range thereof.

26. The method according to claim 25 wherein:
the pattern elements belong to categories thereof;
the category of a pattern elements indicates the value of the message element represented by the pattern element, and the equivalent pattern elements include a pattern element for each of the categories.

27. The method according to claim 26, wherein:
the pattern element values that represent message elements belong to two categories.

28. The method according to claim 27, wherein:
one of the categories is represented in the pattern element value by inverting the pattern element's value.

29. The method according to claim 22 wherein:
the selection of the set of pattern elements is done using a key.

30. The method according to claim 22, wherein:
a message element is repeated in a plurality of sets of pattern elements and further comprising:
for each of the pattern elements that represents the repeated message element, comparing the pattern element that represent the repeated message element with candidate pattern elements that represent each of the possible values of the message element to determine a score with regard to the pattern element for each candidate pattern element;
accumulating for each possible value of the message element, scores for each of the pattern elements that represents the repeated message elements; and
using the accumulated scores to determine the value of the repeated message element.

31. A storage device characterized in that:
the storage device contains code which, when executed by a processor, implements the method according to claim 22.

* * * * *